United States Patent
Roach et al.

(10) Patent No.: US 7,124,195 B2
(45) Date of Patent: *Oct. 17, 2006

(54) BROADBAND NETWORK SYSTEM CONFIGURED TO TRANSPORT AUDIO OR VIDEO AT THE TRANSPORT LAYER, AND ASSOCIATED METHOD

(75) Inventors: Wayne C. Roach, Bowie, MD (US); Joseph DeAngelo, Jr., Mount Laurel, NJ (US); Gil R. Pascal, Frederick, MD (US)

(73) Assignee: Velcero Broadband Applications, LLC, Moorestown, NJ (US)

( * ) Notice: Subject to any disclaimer, the term of this patent is extended or adjusted under 35 U.S.C. 154(b) by 495 days.

This patent is subject to a terminal disclaimer.

(21) Appl. No.: 09/981,666

(22) Filed: Oct. 17, 2001

(65) Prior Publication Data

US 2003/0074445 A1 Apr. 17, 2003

(51) Int. Cl.
*G06F 15/16* (2006.01)

(52) U.S. Cl. .................... 709/232; 709/231

(58) Field of Classification Search ............... 709/224, 709/226, 230–232, 246, 245, 238
See application file for complete search history.

(56) References Cited

U.S. PATENT DOCUMENTS

| | | | | |
|---|---|---|---|---|
| 6,023,581 A * | 2/2000 | Matsuura | ................. | 714/4 |
| 6,501,760 B1 * | 12/2002 | Ohba et al. | ............. | 370/395.42 |
| 6,801,530 B1 * | 10/2004 | Brandt et al. | ............... | 370/392 |
| 2002/0031112 A1 * | 3/2002 | Bennai et al. | ............... | 370/352 |
| 2002/0044553 A1 * | 4/2002 | Chakravorty | ............... | 370/392 |
| 2002/0174438 A1 * | 11/2002 | Cleary et al. | ................ | 725/132 |
| 2003/0074474 A1 | 4/2003 | Roach et al. | | |
| 2003/0074554 A1 | 4/2003 | Roach et al. | | |
| 2003/0076838 A1 * | 4/2003 | Shaio et al. | ................ | 370/467 |
| 2003/0120658 A1 * | 6/2003 | Cameal et al. | ................ | 707/10 |

OTHER PUBLICATIONS

Postel, J.; "User Datagram Protocol", Request for Comments (RFC) 768, Aug. 1980.*
Schulzrinne, H. et al.; "RTP: A Transport Protocol for Real-Time Applications", Request for Comments (RFC) 1889, Jan. 1996.*

* cited by examiner

*Primary Examiner*—William C. Vaughn, Jr.
*Assistant Examiner*—Yemane M. Gerezgiher
(74) *Attorney, Agent, or Firm*—Morgan, Lewis & Bockius LLP

(57) ABSTRACT

A broadband network system configured to transfer user datagram protocol with value-added (UDPVA) packet from to a broadband interface unit (BIntU) transceiver. The broadband network system may comprise a data distribution center and the BIntU transceiver. The BIntU transceiver is configured to generate the UDPVA packet. The BIntU transceiver includes an encoder/decoder (codec) configured to alternatively code or decode UDP frame information and a digital signal processor (DSP) portion. The DSP portion is coupled to the codec. In one aspect, the DSP portion includes a stack that temporarily stores the UDPVA packet within the stack. In one aspect, the UDPVA packet is in a form to be transmitted directly to a network destination address device. In another aspect, the UDPVA packet is available to delivery to a network destination address or storage located on a local area network or a wide area network. In certain aspects, the BIntU transceiver is configured to transmit the UDPVA packet to the data distribution center.

4 Claims, 17 Drawing Sheets

BROADBAND NETWORK SYSTEM CONFIGURED TO TRANSPORT AUDIO OR VIDEO AT THE TRANSPORT LAYER, AND ASSOCIATED METHOD

FIELD OF THE INVENTION

This invention relates to networks and more particularly to broadband networks.

BACKGROUND OF THE INVENTION

Network usage, network technologies, and the number of broadband applications involving networks have been growing at an explosive rate in recent years. The use of such applications as multimedia and teleconferencing involving networks is similarly expanding. Multimedia and teleconferencing applications typically include the transfer of a large bandwidth of video, audio, and perhaps other data types between the source of the transmission and a transceiver located at each one of the end users. Video transfer, audio transfer, and possibly other types of data transfer over networks involve the use of considerable bandwidth. One challenge for network designers and service providers is thus providing sufficient high bandwidth to its end user transceivers for high-bandwidth applications. Another challenge is to maximize the utilization of the bandwidth of existing network infrastructures by maximizing the efficiency of protocols that transfer data between locations.

The Internet has become the medium for the distribution for a variety of multimedia and teleconferencing communications. The Internet has enabled the emergence of such communications and information technology devices as personal computers, laptop computers, Internet phones, and handheld computer devices. These communication and information technology devices have been utilized for the distribution of data among users in either a local area network environment or a wide area network environment. The demands resulting from the convergence of telecommunications, computing, and video distribution technologies also drive technology development.

Transceivers, in addition to its other tasks, append packet header information using a computer processor to packets to be transmitted over the network. The processing time required for the computer processor to route the packet is included in the time required by the transceiver to transmit the data. Therefore, the processing time of the computer processor associated with the end user transceivers contributes to the latency of the transceivers of the network system in transferring data. This increased transceiver latency reduces the data transfer rate between the end user transceivers. Additionally, irregular packet transmission through the computer processor may result in jitter at other end users.

Data distribution centers control and monitor the transmission of such data as audio and video to (or between) end user transceivers. Data distribution centers allot a fixed bandwidth for service, regardless of the application. Even if the application is, for example, a high bandwidth teleconferencing application that requires considerable bandwidth, then the bandwidth allotted to the application is similar to a lower bandwidth application.

Both connection-oriented and connectionless-oriented protocols transfer data (e.g., packets) in different embodiments of communication systems. The user datagram protocol (UDP), for example, is a connectionless transport layer protocol commonly used to transmit packetized data over the Internet. UDP is considered a connectionless protocol since no connection is established between the data source and the end user transceivers; as such packets transmitted between the same data source and the same end users for the same call may follow different paths. Additionally, UDP may provide the packets to the receiver in a different order from which the packets were transmitted. UDP is considered a relatively light protocol since little header information (data) is appended to the packet. Using such a connectionless, best-effort protocol as UDP to transfer data such as audio or video on a broadcast network is somewhat unreliable since an end user transmitter cannot guarantee that an end user receiver will receive the packets. UDP is thus a best-effort protocol that does not guarantee packet transmission or a quality of service (QOS) to its end user transceivers. UDP does not require the use of a time-stamp.

However, providing a more reliable connection-oriented protocol (e.g., one that indicates at the transmitting transceiver that the receiving transceiver received a certain packet) is not effective for retransmitting video or audio applications since the replacement packet would be stale as a result of the round-trip latency necessary to request, and provide, the replacement packet. A stale packet cannot be integrated in an ongoing audio/video program because the stale packet does not accurately reflect the current digital state.

It would therefore be desirable to provide a broadband network system for transferring video/audio data in which the data provided by an end user transmitting transceiver is transmitted directly to the network node (and then to the end user receiving transceiver) without the packet being processed by a computer processor. Passing data through the computer processor associated with the transmitting transceiver necessitates additional processing and header information-appending time. In one aspect, it would be desired to provide a connection-oriented communications protocol that provides a bandwidth selected for any application that guarantees to an end user transmitter a session having a prescribed QOS. The QOS would ensure that the end user receiving transceiver has received and continues to receive transmitted packets. In another aspect, it would be desired to provide security between the transceiver and the data distribution center to ensure that a person communicating from any transmitting transceiver or any receiving transceiver is actually the intended party.

SUMMARY OF THE INVENTION

The present invention is directed to a broadband network system configured to transfer user datagram protocol with value-added (UDPVA) packet from to a broadband interface unit (BIntU) transceiver. The broadband network system may comprise a data distribution center and the BIntU transceiver. The BIntU transceiver is configured to generate the UDPVA packet. The BIntU transceiver includes an encoder/decoder (codec) configured to alternatively code or decode UDP frame information and a digital signal processor (DSP) portion. The DSP portion is coupled to the codec. In one aspect, the DSP portion includes a stack that temporarily stores the UDPVA packet within the stack. In one aspect, the UDPVA packet is in a form to be transmitted directly to a network destination address device. In another aspect, the UDPVA packet is available to delivery to a network destination address or storage located on a local area network or a wide area network. In certain aspects, the BIntU transceiver is configured to transmit the UDPVA packet to the data distribution center.

BRIEF DESCRIPTION OF THE DRAWINGS

The accompanying drawings, which are incorporated in and constitute part of this specification, illustrate the presently preferred embodiments of the invention.

FIG. 2, including

FIG. 3, including

FIG. 6, including

FIG. 7, including

Throughout the figures, unless otherwise stated, the same reference numerals and characters are used to denote like features, elements, components or portions of the illustrated embodiments.

DETAILED DESCRIPTION OF THE EMBODIMENTS

Figure 1:
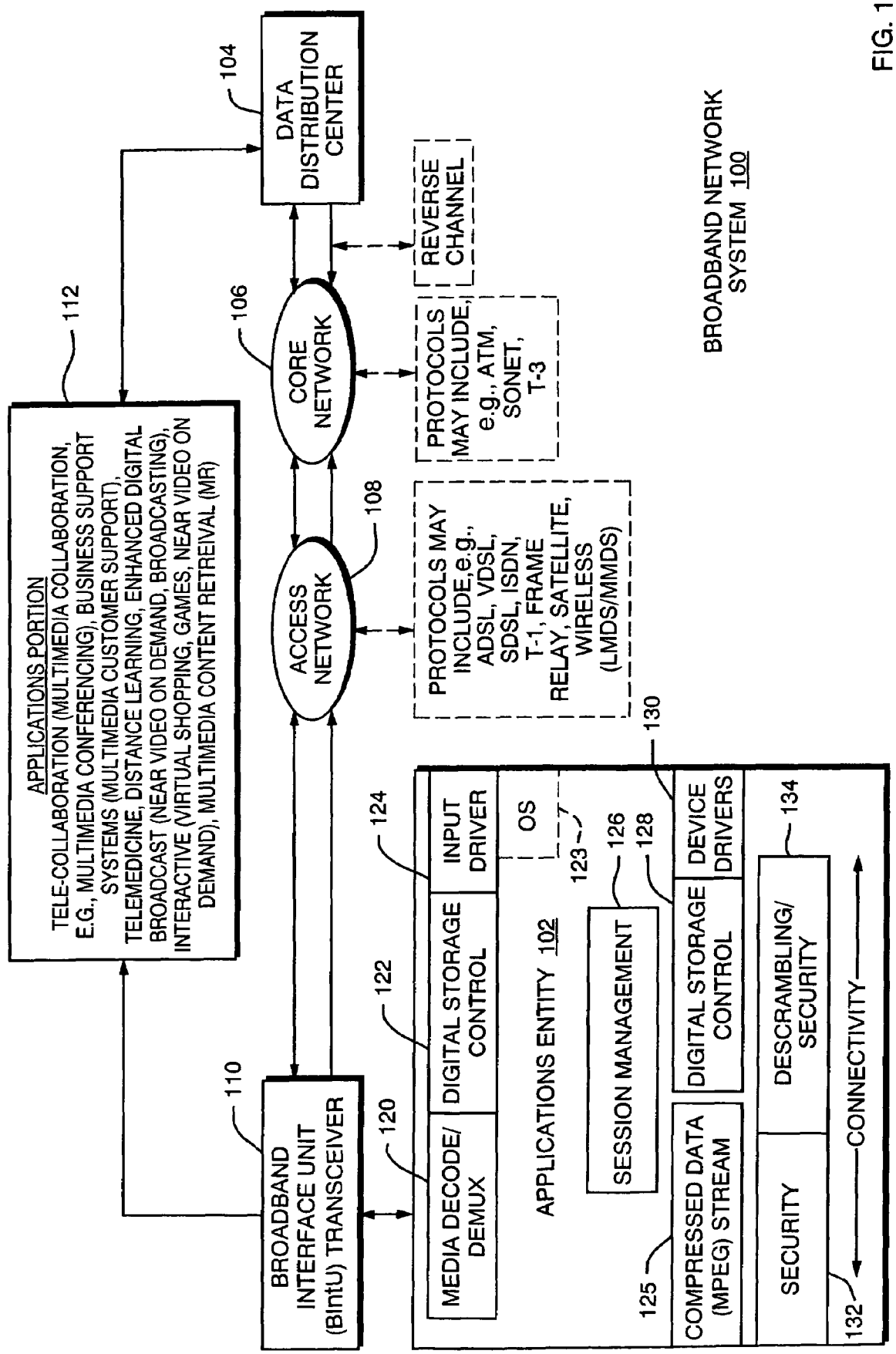
FIG. 1 shows one embodiment of a broadband network system of the present invention including one embodiment of a data distribution center and one embodiment of a broadband interface unit (BIntU) transceiver.

One embodiment of a broadband network system 100 as shown in FIG. 1 is used to transmit video, audio, and/or a variety of data utilized by applications across interactive boundaries of reference to establish at least one virtual channel, each virtual channel extends between a data distribution center 104 and a broadband interface unit (BIntU) transceiver 110. The BIntU transceiver 110 is a device that may be used by end users in such varied applications as transmitting and/or receiving audio, video, and/or other data; communications between multiple end users each located at a distinct BIntU transceiver; and remote monitoring of a location in which BIntU transceivers are located at both the monitoring location and the monitored location. A computer processor does not have to process data transmitted and/or received by any particular BIntU transceiver. As such, data can be directly transmitted or received between a network node and the BIntU transceiver. Limiting the computer processing of video, audio, or other data allows data to be transmitted at a higher transfer rate, and limits the jitter associated with data processing. Stacks may thus be provided at either the data distribution center and/or the BIntU transceiver to transmit and receive a very large amount of data rapidly. Certain embodiments of data distribution center 104 act as a host, monitor and control of data transmitted and/or received by BIntU transceiver, and provides security for sessions or calls involving one or more BIntU transceivers 110. The receipt or non-receipt of the data transferred between the data distribution center to/from multiple BIntU transceivers 110 can be monitored by the data distribution center 104.

There are two aspects of communications between the BIntU transceiver 110 and the data distribution center 104. One aspect involves the BIntU transceiver receiving data stored in the data distribution center. This aspect involves sessions set-up or establishment in which a connection-oriented channel (e.g. a virtual channel) is established between one or more end user BIntU transceivers and the data distribution center. Another aspect involves communications between a plurality of BIntU transceivers 110 via the data distribution center. The latter aspect involves data transfer in which audio, video, and/or other data is transferred at a high data transfer rate between the end user BIntU transceivers 110 via one or more connection-oriented channels. The set-up aspect is provided using the request reply protocol that triggers, e.g., an Internet Control Message Protocol (ICMP) return packet. The data transfer aspect is provided using user datagram protocol with value added (UDPVA). Return control packets for UDPVA are provided using a light weight protocol, e.g., ICMP.

Two general goals of transmission of high bit-rate applications over the broadband network system 100 are: (a) to increase the transfer rate of data over the broadband network system 100; and (b) to ensure transmission of data, within a reasonable period, over the broadband network system 100 under guaranteed Quality of Service (QOS). Certain embodiments of broadband network system 100 achieve one or both of these goals. Certain multimedia, audio/video data transfer, virtual reality, teleconferencing, and/or artificial intelligence applications can be utilized in communications between the BIntU transceiver(s) 110 and the data distribution center 104.

The broadband network system 100 creates an integrated communication, computing, and information systems infrastructure that will enable the delivery, management, processing, and presentation of converged broadband information among a variety of BIntU transceivers 110 used as an end user device. The transmittal of high quality broadband multimedia information is relied on for data transmission. As such, each end user can receive a distinct program not limited by time and/or distance. The broadband network system 100 guarantees a quality of service (QOS) of sessions involving the BIntU transceiver, dynamic bandwidth allocation, and management to compensate for BIntU transceivers running applications that demand different bandwidths, consistent media synchronization, and low latency. One consideration that allows for the increased bandwidth is data storage and transmission via embedded and DSP controlled stacks, and not computer processors, in running applications. The broadband network system 100 provides interactive and distributive video, audio, and/or other data converge in a robust, flexible, and open system design.

The components of the broadband network system 100 extend between the data distribution center 104 utilized by service providers and one or more end user BIntU transceivers 110. The broadband network system 100 is intended to transfer time-dependent media data (such as text, video, voice, images, and/or multimedia information). The design and deployment of the broadband network system 100 infrastructure allows BIntU transceiver access to high-end value-added broadband applications. These applications will provide access of such broadband applications as were, in prior systems, run on personal computers or set-top boxes to end users.

1. Systems Architecture Overview:

An applications entity 102 illustrates certain functional components utilized by the BIntU transceiver 110. The applications entity 102, in general, includes software and/or hardware associated with the applications that can be run by the BIntU transceiver 102. In one embodiment, the applications entity 102 describes the software related to the operation of the BIntU transceiver 110. The applications entity 102 includes a media decoder/demultiplexer 120, a digital storage control 122, an input driver 124, an operating system 123, a session management portion 126, a compressed data (e.g., Motion Pictures Expert Group (MPEG) compatible) stream 125, a digital storage control 128, device drivers 130, a security portion 132, and a descrambling/security portion 134. The media decoder/demultiplexer 120 is configured to decode or demultiplex data received over the broadband network system at the BIntU transceiver 110. The digital storage controls 122, 128 control the memory and buffering within the BIntU transceiver. The input driver 124 includes the device drivers for the BIntU transceiver 110. The operating system controls the end user interface to the BIntU transceiver. The session management control provides for interaction with the data distribution center to establish and breaks down sessions between one BIntU transceiver 110, the data distribution center 104, and perhaps one or more additional BIntU transceivers using the request reply protocol (RRP). The compressed data (MPEG) stream provides for the compression and/or decompression of audio, video, and/or other data between the BIntU transceiver and the data distribution center. The security 132 and the descrambling/security 134 provides for those aspects of security that are associated with the BIntU transceiver as described herein. The applications entity includes the device drivers 130, the session management 126, the operating system 123, the security 132, 134, and the other aspects of running the application portion 112.

The application portion 112 of the broadband network system 100 describes the applications that are utilized that involve data transfer between one or more broadband interface unit transceivers 110 and the data distribution center 104. A few non-limiting examples of applications that can use the broadband network system 100 include teleconferencing, movies, video games, and interactive entertainment systems.

Figure 2A:
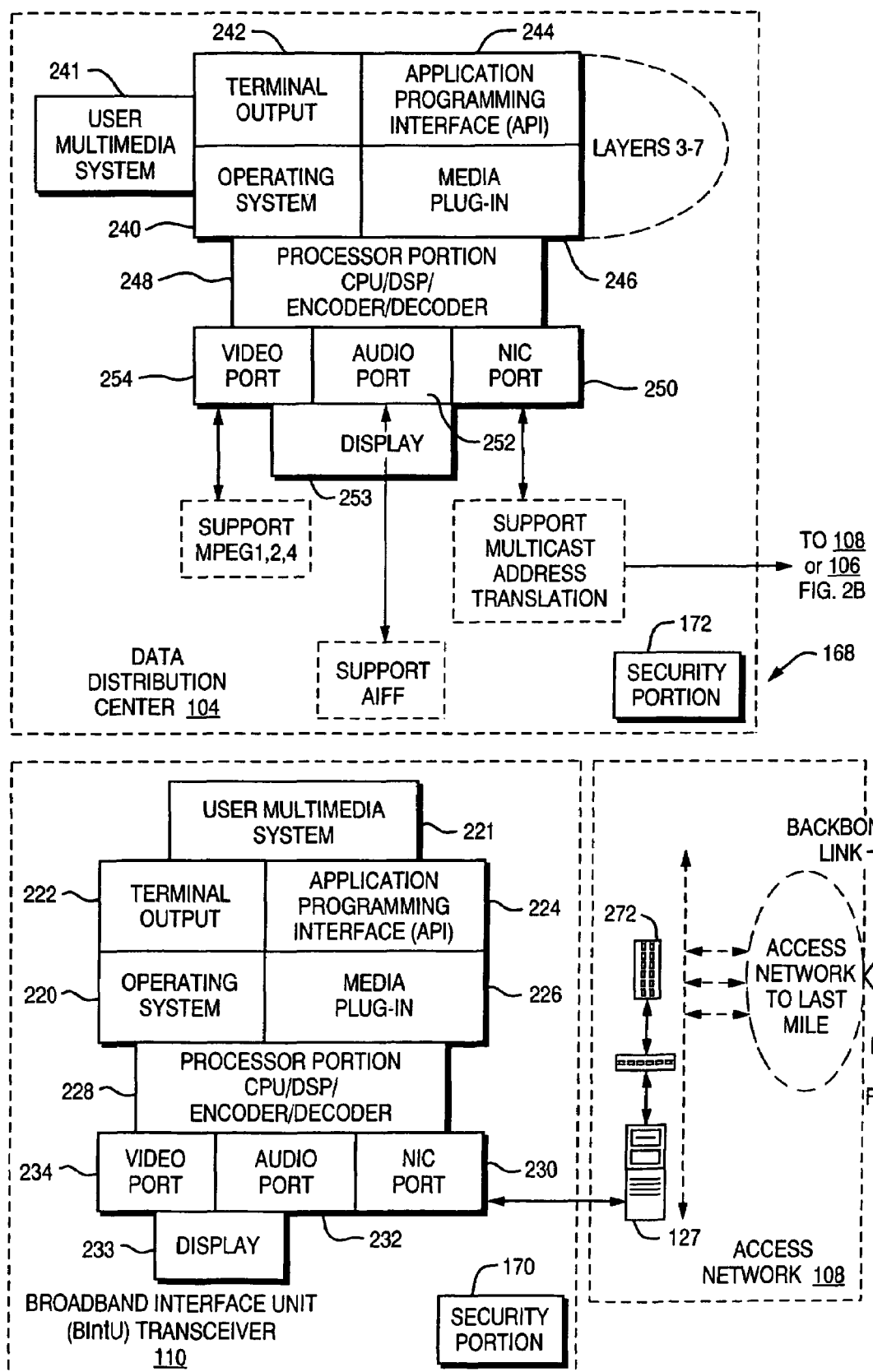
FIGS. 2A and 2B, shows an expanded view of one embodiment of the broadband network system shown in FIG. 1.
Figure 2B:
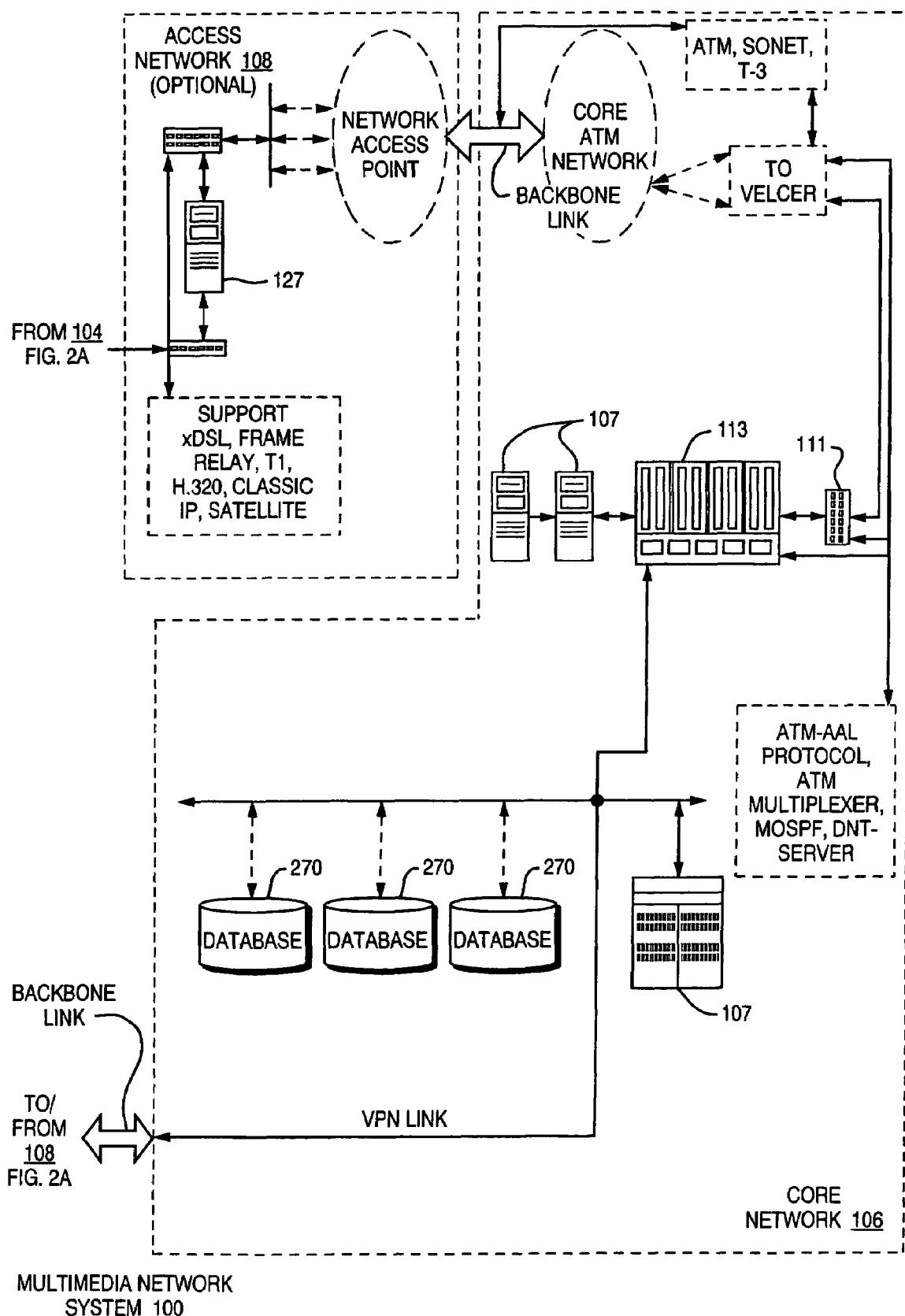

FIG. 2 shows in greater detail an embodiment of portions of the broadband network system 100 shown in FIG. 1. The broadband network system 100 includes the data distribution center 104, a network (one embodiment including a core network 106 and one or more access networks 108), and the broadband interface unit (BIntU) transceiver 110. The combination of the access networks 108 and the core network 106 of the broadband network system 100 may be fashioned as a variety of local area networks and wide area networks, as generally known in the network art.

The broadband network system 100, including the data distribution center 104 and the BIntU transceiver 110, could be applied to a variety of other applications, including, but not limited to, media collaboration applications, education applications, training applications, entertainment applications, and medical applications. Examples of media collaboration applications include visual communications, data collaborations, and voice communications. A variety of sub-applications will serve the commercial and other environments including telework, hosted virtual malls, management meetings, design collaboration, hosted virtual meetings, etc.

Examples of education and training applications include hosted corporate training suites, digital library services applications, interactive visual education applications, and distance learning applications. Examples of entertainment applications include video on-demand applications, movie on-demand applications, television, cable television, high-definition television, live event broadcasts, and alternate cable distribution systems. Examples of medical applications include tele-medicine applications, medical management support applications, health insurance management applications, and emergency response applications.

There are many possible data transmission path configurations of a prescribed bandwidth and deliver mechanism that may be established after a virtual circuit is established over the broadband network system 100 so that all the data provided by the data distribution center provided to the BIntU unit. These embodiments of broadband network system including the BIntU transceiver and the data distribution center are referred to as unidirectional or bi-directional. The data transmitted over either unidirectional or bi-directional broadband network systems could either be live or could be digitally stored media. previously taped and stored.

In the bi-directional embodiments, communications are provided simultaneously between multiple BIntU transceivers. In this embodiment, data generated at a first BIntU transceiver 110 to a second BIntU transceiver is initially transmitted over a virtual circuit established in the broadband network system 100 to the data distribution center 104. The data can be transmitted over a second virtual channel extending from the data distribution center to a second BIntU transceiver 110. Simultaneously, data can be transmitted to the second BIntU transceiver 110 over a virtual circuit to the data distribution center 104 and over another virtual channel circuit to the first BIntU transceiver 110.

In another embodiment of broadband network system 100 virtual connections circuits are set-up and data are transmitted unidirectionally from the data distribution center 104 to the BIntU transceiver 110. In this case, data (e.g., audio and/or video) may be stored in a database located in a server, and stored data can be accessed from the database and transmitted at a high bit rate to the BIntU transceiver 110. This embodiment is used when an end user at a BIntU transceiver 110 wishes to unilaterally access data from a database or audio/video from a remote server (with the database and the remote server located at the data distribution center 104). The end user at the BIntU transceiver 110 initiates a session with the data distribution center. To establish a session, an application programming interface 224 in FIG. 2A requests setting up an application by requesting availability of a channel hosted by the data distribution center 104. Regardless of the embodiment of session established within the broadband network system, one or more virtual circuits are established between one BIntU transceiver 110 and one data distribution center 104. The data distribution center 104 acts as a host or moderator to control the presentation of the data or information to/from each participating BIntU transceiver 110. Data is transmitted from the data distribution center to the BIntU transceiver 110.

The broadband network system 100 comprises multiple core areas of reference. These areas of reference are compiled to form an embodiment of collaborative convergence services architecture (CCSA) as diagramed in FIG. 1. The areas of reference include, but are not necessarily limited to, the end user (BIntU transceiver 110) reference, the access network 108 reference, the core network 106 reference, and the data distribution center 104 reference. Each of these referenced areas introduces a methodology in designing and deploying effective quality of service (QOS) parameters to ensure that the broadband network system 100 is allotted sufficient bandwidth to guarantee the data quality for the application for each BIntU transceiver 110 or communicating groups of BIntU transceivers 110.

The end user reference at the BIntU transceiver 110 represents the recipient of the data provided by the technology of the broadband network system that ensures that guidelines for QOS and open systems compatibility are maintained. The core element for the end user reference is the BIntU transceiver 110. The BIntU transceiver 110 represents a system-layer end user transceiver that incorporates the functionality of an encoder, a decoder, a high-level digital signal processing (DSP) platform, a network interface connection, and a router. The best available components optimized for speed and reliability are integrated into the BIntU transceiver 110. The BIntU transceiver 110 represents an essential connectivity element to the end user for the broadband network system 100. The methodology in designing the end user interface of the BIntU transceiver is driven by the need to ensure that processing of differing media types is effectively handled by components specifically created for that purpose. For example, an efficient codec is provide to encode and/or decode data in the form of compressed data; a DSP portion is provided for the effective processing of a large amount of data; and a stack portion is provided to transfer large volumes of data.

In another embodiment, assuming a session is established between multiple BIntU transceivers 110, it may be desired to extend the session to other BIntU transceivers 110. For example, assume that two individuals, Fred and Jane, are conversing using their individual BIntU transceivers 110 in an established session. Assume that it is desired to further include Mary in this session. This inclusion of Mary can be provided as described herein.

The network portion of the Broadband network system 100 is structured to provide effective and rapid data transfer between the BIntU transceiver and the data distribution center. With reference to the core network 106 includes a variety of servers 107 (or other computers) that provide an interface between the BIntU transceiver 110 and the data distribution center 104. In one embodiment, the data distribution center 104 is connected directly to the core network 106 so that data or other information generated by the data distribution center 104 may be applied directly to the core network 106 to provide the transfer of a large volume of data to the BIntU transceivers. In another embodiment, an access network is provided between the core network and the data distribution center. Switches or hubs 111 (which are open system interconnect (OSI) network layer 2 devices) may be included in the core network 106 in addition to routers 113 (that are OSI network layer 3 devices). The switches or hubs 111 and routers 113 are used to direct or route data between the BIntU transceiver 110 and the data distribution center 104 to the desired location within the broadband network system 100.

Databases 270 may be included in the core network 106. The databases 270 store such data as, e.g., video, audio, or other stored packets. The data in the databases 270 may be accessed, distributed, and/or stored by the data distribution control center. Alternatively, the databases 270 may be located within the data distribution center.

The core network 106 typically utilizes such high-speed network protocols as asynchronous transfer mode (ATM), ATM over Internet, synchronous optical network (SONET). The core network 106 is also known in the industry as the "backbone" since it carries an extremely large amount of data within areas of heavy usage. The core network 106 is configured to transmit video, audio, and/or other data at exceptionally high rates. The bandwidth of the core network is dynamically allocated to provide a QOS to end users. The QOS is related to the applications that the BIntU transceivers used by the end users. For example, most (convergence) teleconferencing applications require a considerably larger data transfer bit rate than most data specific file transfer applications. As such, if two end users are teleconferencing over their respective BIntU transceivers 110, the data rate allocated over the broadband network system 100 necessary to provide a QOS for a teleconferencing application is relatively large compared with the necessary data rate to provide a similar QOS for a file transfer application. As such, one embodiment of the data distribution center 104 can allocate a virtual channel of a controllable bandwidth between each BIntU transceiver 110 and the data distribution center. In other embodiments of the data distribution center 104, the bandwidth of the controllable channel is dynamically allocated so additional applications can be added, other applications can be removed, and/or the bandwidth allotted to certain applications can be adjusted.

As more sophisticated applications that require greater bandwidth are used by the broadband network system 100, it is desired to increase the bandwidth of the data being transmitted between the data distribution center 104 and the BIntU transceiver 110. Conversely, as more bandwidth is provided, more data can be transmitted between the data distribution center 104 and the BIntU transceiver 110.

The access networks 108 include a plurality of servers 127 that are configured as computers to store and/or access data. The servers 127 include a central processing unit, a memory, and input/output devices as other computers. Switches or hubs, in addition to routers, are switching devices that may be included and utilized in the access networks 108 to direct data to the desired location within the broadband network system 100 (i.e., to the desired servers 127). The OSI network layer of the broadband network system 100 is configured to establish network routing, addressing, call set up, and call tear down, as generally known in network technology. The access networks 108 operate to route packets to or from the core network 106. There is a plurality of access networks 108 associated with each core network 106, the access networks allow the end users to access the core network. Access networks 108 connect the core network 106 to one or more of such network devices as the BIntU transceiver 110. The access network 106 is sometimes known in the industry as "the last mile" since it provides the connections between the core network 106 and network devices such as the BIntU transceiver 110 and the data distribution center 104. The data distribution center 104 may be connected directly to the core network 106 to provide enhanced bandwidth. In one embodiment, the BIntU transceiver 110 is included as a standalone unit. Each end user or group of end users in a network configuration can utilize a devoted BIntU transceiver 110.

One embodiment of the data distribution center 104 is configured to include a variety of servers (or other computers) to interface with the BIntU transceiver 110, the core network 106, and the access networks 108. The data distribution center 104 is configured to transmit video, audio, and/or other data at exceptionally high rates while guaranteeing a QOS to end users. The data distribution center 104 preferably utilizes such network protocols as frame relay, xDSL, or other such high-speed access network protocols to transmit large amounts of data within a large bandwidth.

The embodiment of the BIntU transceiver 110 shown in FIG. 2 includes an operating system 220, a user multimedia system 223, a terminal output 222, the application programming interface (API) 224, a media plug-in 226, a processor portion 228, a network interface card (NIC) port 230, an audio port 232, a video port 234, and a display 233. The user multimedia system 223 generates, or receives, raw audio and/or video data from such a device as a teleconferencing unit or video camcorder that include services such as may be transmitted over the broadband network system to one or more BIntU transceivers 110. BIntU transceivers are configured as end user devices in which certain embodiments allow end users to interface with each other using, e.g., teleconferencing applications while other embodiments allow end users to access video, audio, and/or other data from the data distribution center. The user multimedia system can, depending on the application, display audio, video and/or other data from other remote BIntU transceivers 110. Multiple applications and services may be transmitted between the data distribution center 104 and the BIntU transceivers 110 over cable, satellite, hard wires, optical systems, or any known transmission system or computer network. The user multimedia system 221 therefore, typically, integrates a large variety of services that may be transmitted as a broadband signal. The operating system 220 allows a human network manager to interface with, repair, or control the overall operation of the BIntU transceiver 110.

The terminal output 222 overviews the transmission of data to the data distribution control center. The user multimedia system 221 interfaces with the API 224 to allow the BIntU transceiver 110 to interface with the data distribution center 104. The media plug-in 226 allows the BIntU transceiver 110 to interface with the data distribution center 104 by means of whichever particular program the BIntU transceiver 110 is utilizing. For example, a video system would require that a particular video embodiment of the media plug-in 226 be installed in the BIntU transceiver 110 to allow the BIntU transceiver 110 to transmit data to the data distribution center 104 over, and receive data from the data distribution center 104, over the network (including the combination of the access networks 108 and the core network 106, e.g., the Internet).

In a similar manner, the audio port 232 of the BIntU transceiver 110 is configured to transmit data over the access networks 108 and the core network 106 to/from the data distribution center 104. The NIC port 230 contains hardware and/or software so the BIntU transceiver can interface with the data distribution center 104 to transmit, e.g., user datagram protocol with value-added (UDPVA) packets as described herein. The content and structure of value-added information that differentiates UDPVA packets from user datagram protocol (UDP) packets is described herein. The UDPVA packets are transmitted from the BIntU transceiver 110 via the core network 106 and the access networks 108 to the data distribution center 104. The processor portion 228 controls the overall operation and programming of all processes of the data distribution center 104.

Figure 3A:
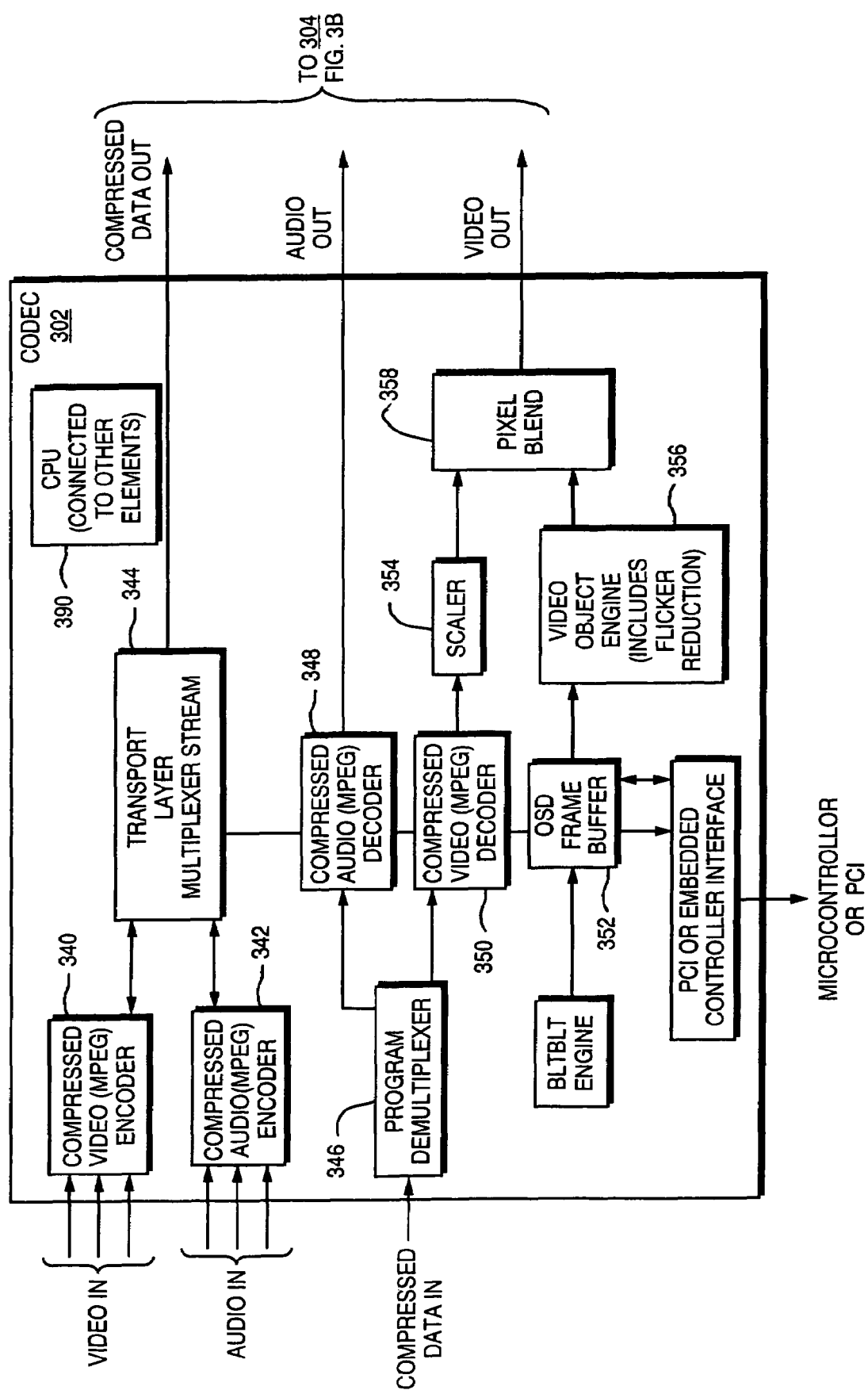
FIGS. 3A and 3B, shows a block diagram of the hardware associated with one embodiment of the BIntU transceiver of the broadband network system shown in FIG. 2.
Figure 3B:
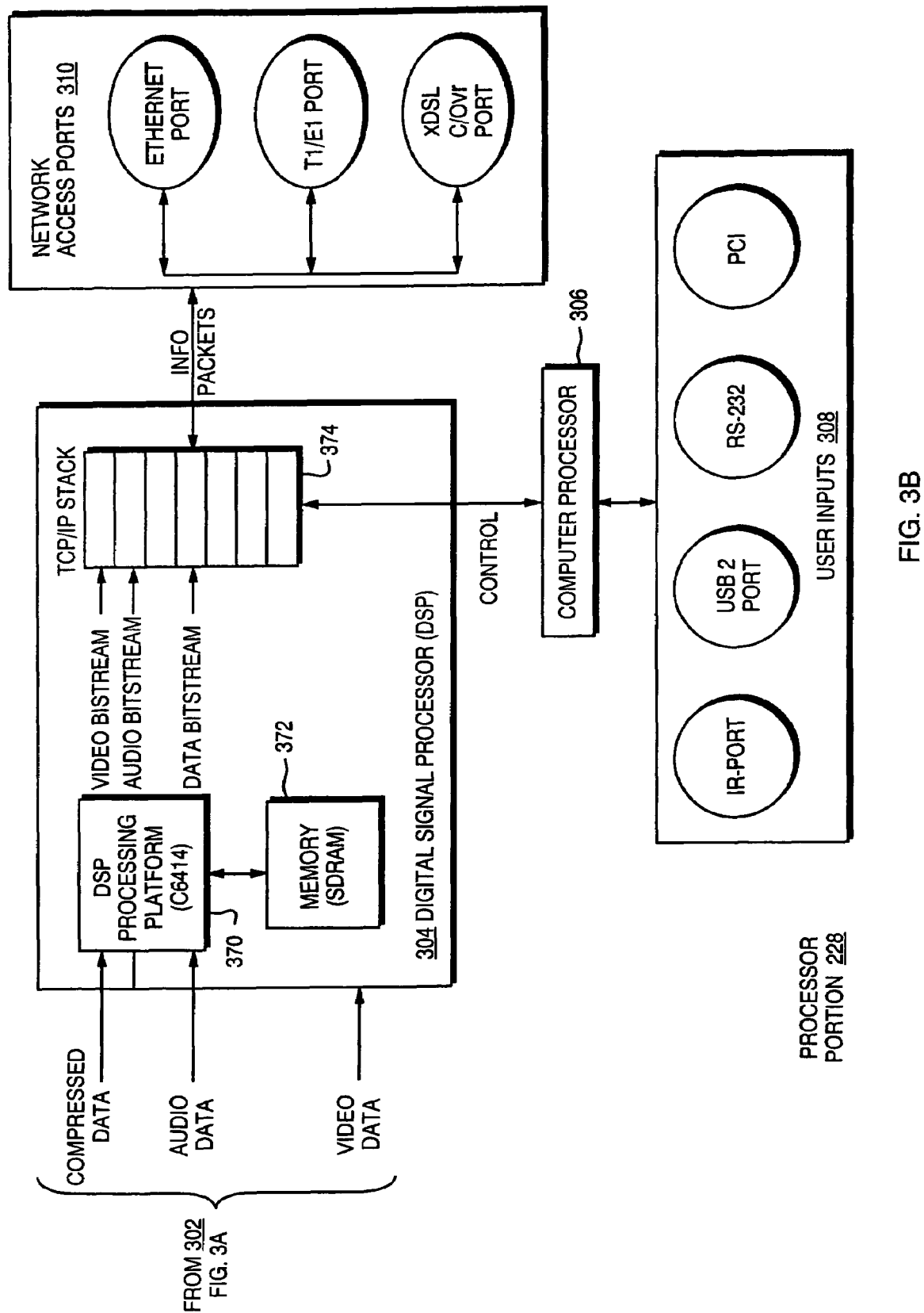

An embodiment of processor portion 228 of the BIntU transceiver 110 as shown in FIGS. 3A and 3B may be provided within the broadband network system 100 shown in FIGS. 1 and 2. The processor portion 228 includes an encoder/decoder (codec) 302', a digital signal processor (DSP) 304', a computer processor 306, user inputs 308 including, e.g., infrared (IR) port 380, USB port 382, RS-232 port 384, and network access ports 310. The DSP 304 allows the BIntU transceiver 110 to process the raw data to be input to, or received from, the access network 108. Additionally the DSP 304 processes data provided by the codec 302. The codec 302 allows for the encoding/decoding of data being transmitted in different forms between the access networks 108 and the data distribution center 104. The processor portion 228 utilizes various software algorithms to maximize the amount of video, audio, and/or other data that are transmitted from the codec 302 via the DSP 304 to the network access ports 310. The network access ports 310 may be considered as the entry to the broadband network system 100 from the BIntU transceiver 110. The network access ports 310 are configured to allow interfacing with a variety of network protocols, for example, the Internet Protocol (IP), T1, or DSL. The network access ports 310 are configured to provide a local area network (LAN) interface. The CPU 306 is typically located within such a computer system as a server, a personal computer, or a laptop. The user inputs 308 allow a variety of BIntU transceivers 110 to interface with the data distribution center 104 shown in FIG. 2.

The processing demands of transferring a packet within the broadband network system 100 between the data distribution center 104 and the BIntU transceiver 110 must be addressed to facilitate an acceptable QOS for deployed applications, regardless of the bandwidth required by each application. The BIntU transceiver 110 is therefore configured to dedicate processing to a single capable DSP 304 that is able to rapidly transfer a very large bandwidth of data directly to a network access port 310. One embodiment of the DSP 304 that is configured to provide such a high bandwidth is the TMS32OC6000 DSP Series 304 or TMS32OC6414 DSP 304, both produced by Texas Instruments. (Each DSP is typically referenced by their series).

The embodiment of DSP 304 in FIG. 3B includes the DSP processing platform 370, the memory control 372, and the TCP/IP stack 374. The DSP processing platform 370 receives compressed audio, video, and other data from the codec 302. The memory control 372 includes memory and/or data that are used by the DSP processing platform 370 in transmitting the compressed audio, video, and other data from the codec 302 and outputs all of this data into the TCP/IP stack 374. The TCP/IP stack 374 acts as a very rapid buffer (i.e., memory) that allows compressed audio, video, and other data to be output directly to the network access ports 310 typically in the transport layer of the OSI model. Although the stack discussed in this disclosure is identified as a TCP/IP stack 374, it is envisioned that any type of stack operating at the transport layer that can be applied to this application is within the intended scope of the present invention. Data transmitted from the TCP/IP stack 374 to the network access ports 310 are in the form of information such as data packets. The data packets output from the TCP/IP stack 374 are in a form which in different embodiments can be transmitted over Ethernet, Token Ring, DSL and/or other LAN transport protocols. The DSP 304 sends the UDP when an audio/video packet is being transmitted. The audio/video packet transmitted from the codec 302 via the DSP 304 to the network access ports 310 therefore does not have to travel from the TCP/IP stack 374 in the DSP 304 via a computer processor 306 when travelling to the network access ports 310. The TCP/IP stack 374 is an indicator for UDP delivery sent at the TCP/IP stack 374 level. Since the transmission of the packets occurs at (i.e., is pushed to) the transport layer and lower-level layers instead of at the application layer, the amount of processing necessary to transfer the packets between the BIntU transceiver 110 and the data distribution center 104 is less than if application layer protocols were involved in transferring the packets.

The embodiment of the DSP 304 that can be used for such applications as teleconferencing is provided with a powerful DSP processing platform 370 (that interfaces with memory control 372) and a robust TCP/IP stack 374. In general, the TCP/IP stack 374 may be considered to be relatively small, indicating that the purpose of the stack is to transfer a large volume of data quickly, not to store the data. The DSP 304 is configured, in a preferred current embodiment, to offer an extremely high performance of, e.g., up to 2000 million instructions per second (MIPS) at 250 MHz and is designed for the development of multi-channel, multi-functional applications.

Any other embodiment of DSP 304 that is configured (e.g., with a TCP/IP stack) to provide an increase in system integration and a simplified design for embedded systems needing network connectivity is within the scope of the DSP 304 of the present disclosure. The DSP 304 can be configured to operate by running an extra duty (e.g., another application) on the same DSP 304 as other applications. This system integration limits the need for a separate network processor and uses a more cost effective media access control (MAC) physical layer (PHY) device instead. In addition, latency through the DSP 304 is limited.

The BIOS of the DSP 304 provides the basic framework of the DSP 304 chipset. The DSP 304 is designed to support the construction of extensive operating environments. A TCP/IP software package that supports the TCP/IP stack 374 and accompanies the embedded environment of the chipset is designed to be a transparent add-on to the BIOS of the DSP. The DSP is preferably configured to transfer a large amount of data through the stacks. The TCP/IP software package is adaptable to being run in different operating modes with varying types of scheduling and exclusion methods. The TCP/IP stack 374 offers a wide variety of customizing options that makes maintaining QOS over a range of convergence applications an achievable goal. In essence, the TCP/IP stack 374 is designed to provide a fully functional environment that includes routing and is based on an effective memory controlled small footprint.

The TCP/IP stack 374 is designed with a small footprint that enables the utilization of small amounts of program memory and data memory for running several protocol-type services. The TCP/IP stack 374 preferably has a small footprint, and the resultant controlled utilization of data memory thus ensures efficient use of memory buffers. UDP and RAW sockets use limited service options to maintain a controlled memory state. This results because a bucket-based memory manager is included. The bucket-based memory manager eliminates memory fragmentation and tracks memory leaks. The TCP/IP stack library includes a thin operating system adaptation layer that allows it to work with multiple flavors of BIOS configurations. The TCP/IP stack 374, which utilizes considerable software, also includes a hardware abstraction layer (HAL), a scheduling control module, and an operating system abstraction. Many customization options that may be required by varying applications may be configured for use through manipulation of the hardware drivers in the HAL interface to the operating system. This potential for customization also enhances the of the TCP/IP 374 stack appeal to a cross-platform of available operating environments. Because of its flexible, but robust, design and the range of customizable options available, the TCP/IP stack 374 can also be used as a TCP/IP client, a TCP/IP server, a protocol server, or a fully functional router.

The codec 302 included in the BIntU transceiver 110 includes a compressed video (e.g., Motions Picture Expert Group (MPEG) compatible) encoder 340, a compressed audio (e.g., MPEG compatible) encoder 342, a transport layer multiplexer 344, a demultiplexer 346, a compressed audio (e.g., MPEG) compatible decoder 348, a compressed video (e.g., MPEG compatible) decoder 350, a frame buffer 352, a scaler 354, a video object engine (e.g., flicker reduction unit) 356, and a pixel blend 358. The term "MPEG" is used in this disclosure to describe one well-known and standardized embodiment of audio/video compression. Any other audio/video compression system may alternatively be used instead of MPEG compression and still remain within the intended scope of the present invention. The transport layer multiplexer 344 multiplexes the encoded video signal from the compressed video (MPEG) encoder 340 with the encoded audio MPEG information from the compressed audio (MPEG) encoder 342. It is envisioned that one or multiple compressed video (MPEG) encoders 340 and one or multiple compressed audio (MPEG) encoders 342 as shown in FIG. 3A may be provided to enhance the data transfer rate of the broadband network system 100. The transport layer multiplexer 344 transmits compressed data to the DSP 304. The program demultiplexer 346 receives compressed data and transmits the demultiplexed data respectively out to the compressed audio (MPEG) decoder 348 and the compressed video (MPEG) decoder 350.

One aspect of embedded systems is that the functionality of the codec and the DSP can be combined and optimized using a single development kit. Therefore, the codec and the DSP chip together become a package using the development kit. The development kit actuates the functionality of the codec and DSP, and is integrated in the DSP. It is envisioned that the codec provides encoding and/or decoding function associated with such audio and video data compression schemes as motion pictures expert group (MPEG), as defined by standards. As MPEG technology becomes popular through standardization, different flavors of MPEG have been developed (and delineated by different numbers such as MPEG 2, MPEG 4, MPEG 7 etc.) depending on the particular application. In certain embodiments of the broadband network system 100, MPEG 4 functionality can be provided using the same family of DSP (e.g., the TI C6000 family) as the DSP that provides the MPEG 2 functionality. MPEG 4 is supported by the 6414 DSP, for example. MPEG 2 is supported by the 6717 DSP. As such, flavor of MPEG can be selected based on the particular DSP selected.

The MPEG 4 functionality is especially suited for compression within certain embodiments of the broadband network system 100. MPEG 4 provides the same product functionality plus additional functionality compared to MPEG 2. This permits the use of data transfers. Using this improved functionality, the broadband network system can go as low as 64K. The rate transfer using existing technology is about 8,800 MIPS using the 6414 DSP.

MPEG 2 ranges up to 50 Mbits per second. MPEG 2 is thus designed for use, and is most prevalently, for normal video and audio. MPEG 4 is used mostly at a lower rate of transfer. At the lower transfer rate, MPEG 4 provides better image and audio quality. MPEG 4 can also manipulate objects in a background. The background can also be manipulated. For example, MPEG 4 permits an object located in a first scene to be transplanted by inserting the object in another unrelated or manipulated scene using the paint function.

The transfer rate for MPEG 4 is not too low to allow for effective transfer of quality video. The transfer rate is, however, relatively low in terms of the quality of image required a particular application. Thus, while the quality provided by MPEG 2 for certain applications may be relatively high the quality provided by MPEG 4 is even higher. The transfer rate of MPEG 4, however, is lower. Commercial applications in particular can use a standard application on MPEG 4 video/audio compression with the same QOS as MPEG 2. With MPEG 4, less bandwidth can be used compared to MPEG 2 because the user can obtain a finer image using the same bandwidth as for MPEG 2. Using less bandwidth is desired for the broadband network system 100 since it is envisioned that a large volume of data will be transferred.

The end users at the BIntU transceivers 110 are provided with better control of the screens displayed over the display 233. As such, the end user can better utilize the screens displayed over the display 223. MPEG permits providing interaction between sockets in the data distribution center 104 and sockets on the BIntU transceiver 110. Using the different screens displayed on the display 233, different video screens can be provided and selected.

MPEG 4 allows a sweep that involves the same encoding and decoding processes. The sweep is an example of an enhancement provided by MPEG 4. A chipset is used in the codec for the encoding and decoding processes since hardware can encode/decode packets faster than software performing the same functionality. The use of one embodiment of codec 302 such as the ITVC15 by GlobeSpan, Inc.™ permits the encoding/decoding processing to be varied depending on the selected application. The codec 302 allows the existing functionality to remain the same, but added functionality to be added to the overall BIntU transceiver 110.

MPEG 2, MPEG 4, MPEG 7, MPEG 21, other MPEG, and other audio/video data compression schemes can each be supported in different embodiments of the broadband network system 100. The selected codec 302 and DSP 304 largely define the operation of the BIntU transceiver. MPEG 7 is focused largely on improving quality of service. Thereby the applications utilized by the BIntU transceiver can be changed while maintaining the quality of service. MPEG 21 focuses largely on data management techniques. MPEG 21 also focuses largely on security.

The embodiment of the data distribution center 104 shown in the embodiment of the multimedia network system 100 of FIGS. 1 and 2 includes an operating system 240, a user multimedia system 221, a terminal output 242, an application programming interface (API) 244, a media plug-in 246, a processor portion 248, a network interface card (NIC) port 250, an audio port 252, a video port 254, and a display 253.

The operating system 240 allows end users at the BIntU interface to interface with the data distribution center 104 and to control the overall operation of the data distribution center 104, such as running an application, altering lists of customers, adding or removing audio, video, and/or other data on databases and/or servers. The user multimedia system 241 stores audio, video, and/or other data on a database and/or server. The terminal output 242 is configured to allow the data distribution center 104 to access the audio, video, and/or other data in the user multimedia systems 241. The user multimedia system 241 interfaces with the API 244 to configure the data distribution center 104 to allow interfacing with the BIntU transceiver 110. The media plug-in 246 provides an interface between the data distribution center 104 and the particular application being accessed by the BIntU transceiver 110. For example, if an end user is using a video application, then a corresponding video plug-in loaded in the media plug in 226 of the BIntU transceiver 110 would have to communicate with a video plug-in loaded in the media plug-in 246 loaded in the data distribution center 104. This interaction between the media plug-ins 226, 246 would allow the BIntU transceiver 110 to interface with a video and audio application, and thereby display a particular video image projected from either the data distribution center 104 or another BIntU transceiver 104. The video port 234 is configured to be connected to a display 253 to allow a user to view information obtained by the BIntU transceiver 110. At the application layer of the data distribution center 104, an the API 244 allows for a packet to be transmitted by the BIntU transceiver 110 in a manner intended for the packet to reach its destination point.

The audio port 242 is configured to receive the audio packet transmitted over the access networks 108 and/or the core network 106 from the data distribution center 104. Audio at the data distribution center 104 is transmitted to, or received from, the BIntU transceiver 110 over the broadband network system 100. The NC port 250 contains hardware and/or software that allow the BIntU transceiver 110 to interface with the access networks 108 and the core network 106. In one embodiment, the processor portion 248 controls the overall operation and programming of the BIntU transceiver 110. The codec allows for the encoding/decoding of data being transmitted from the data distribution center 104 over the core network 106 and the access network(s) 108 to/from the BIntU transceiver 110. The processor portion 248 allows the BIntU transceiver 110 to process the raw data input by the access networks 108 using the DSP portion.

Figure 4:
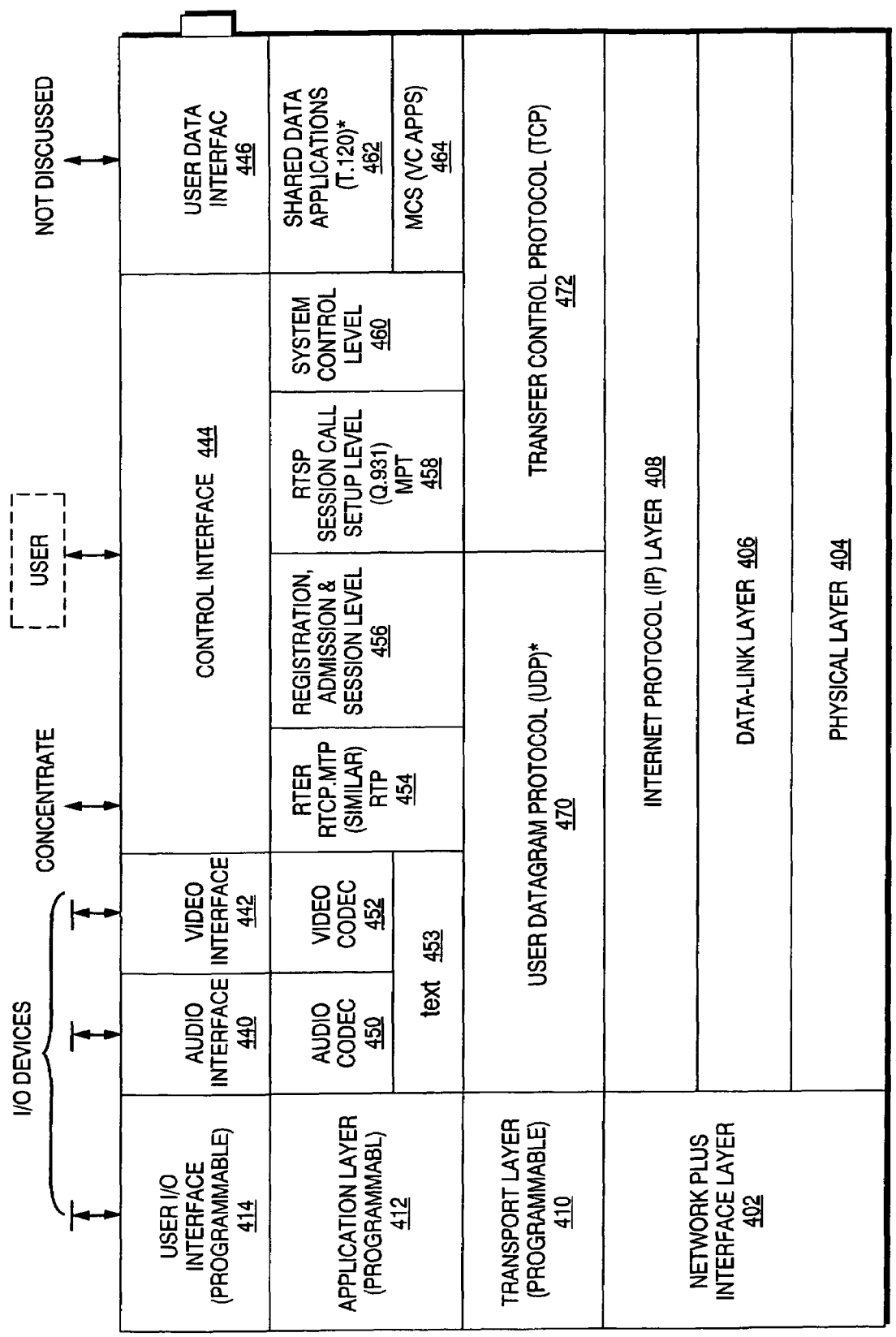
FIG. 4 shows one embodiment of protocol layers, modeled on the OSI protocol layers, that is utilized by the broadband network system shown in FIGS. 1 to 3.

FIG. 4 shows one embodiment of OSI protocol layers of the BIntU transceiver. The OSI protocol layers are utilized to transmit data between the end users of the broadband network system 100 shown in FIGS. 1 to 3. A network plus interface layer 402 is shown that includes a physical layer 404, a data-link layer 406, and an Internet Protocol (IP) layer 408. The OSI protocol layers further include a transport layer 410, an application layer 412, and a user I/O interface layer 414. Also included in the OSI protocol layer summary, but not shown explicitly, are a session layer and a presentation layer that are located between the application layer 412 and the transport layer 410. Transfer of data between the various devices in the broadband network system 100 occurs at (i.e., is pushed to) the transport layer 410 and below.

The physical layer 404 is configured to provide the physical interface connections to transmit data over a single connection between adjacent nodes. The data-link layer 406 provides for the control of the transmission of data over a data link. The transport layer 410 provides end-to-end message transfer. It is therefore the function of the transport layer 410 to allow data to be transmitted over the network (e.g., the Internet) regardless of the protocol being utilized in the particular network. The session layer provides for dialogue between and synchronization control of application entities. The session layer controls the setting-up and breaking-down of sessions between the BIntU transceiver 110 and the data distribution center 104. The presentation layer provides for transfer of syntax negotiations to the application layer 412. The application layer 412 provides file transfers, access and management, document and message interchange, job transfer, and manipulation for the end user. The particular BIntU transceiver 110 is attached to the application layer 412 at a point indicated at the user I/O interface layer 414. The OSI protocol layer model is generally known, and a more detailed description is provided in "Data Communications, Computer Networks and Open Systems," by Fred Halsall, Addison-Wesley Publishing, 1992 (incorporated herein by reference).

The IP layer 408 is chiefly used for control of network packet setup within the broadband network system 100. The IP layer 408 allows for a free mode of control which acts to manage the IP. Header information can be inserted at the network (i.e., IP) layer, but the (IP) information has to be maintained within a small slot. The header information is the same prior to transport of the packets and after the transport of the packet. In the broadband network system 100, the role of the IP layer 408 is limited to setting up the management system that indicates whether the packets are being properly routed.

The user I/O interface layer 414 includes an audio interface 440, a video interface 442, a control interface 444, and a user data interface 446. The audio interface 440, the video interface 442 and the user data interface 446 are configured to interface with I/O devices of the respective audio, video, and user device variety. The audio, video, and user I/O device may be, for example, an input camcorder that takes images for audio from an individual, a computer that end users can apply a variety of input to, or other similar devices. The control interface 444, that is typically under the control of the end user BIntU transceiver or alternatively data distribution center. The control interface allows an end user to control the sessions setup and breakdown, registration, admission, etc. of the broadband network system 100.

The applicant application layers 412 include an audio codec 450, a video codec 452, a real time protocol (RTP), application 442, registration, admission and session level 456, a RT real time session protocol (RTSP), session call and setup level 458, a system control level 460, a share data applications 462, and an MCS 464. The audio codec 450, may include the compressed audio (MPEG) encoder 342 and the compressed audio (MPEG) decoder 348 as shown in FIG. 3A of the codec 302. The video codec 452 may include the compressed video (MPEG) encoder 340 and the compressed video (MPEG) decoder 350 in the codec 302 shown in FIG. 3A. A text application 453 may also be included that relates to audio codec 450 and the video codec 452. The real time protocol application 454 is further described herein, as is the real time session protocol (RTSP) 458. The registration, admission and session level 456 relate to the control of the sessions in which virtual circuits are established between the BIntU transceiver and the data distribution center. The system control level 460 relates to the applications that handle the overall system operations between the BIntU transceiver and the data distribution center. The shared data applications 462 relate to those applications in which the data can be accessed by, or stored by, a plurality of distinct end users.

The transport layer 410 includes, in different embodiments, the user datagram protocol (UDP) 470 and the transfer control protocol (TCP) 472. The transport layer 410 relates as transportation of data between end users. The UDP 470 is a connectionless protocol that can be modified as described herein to form UPDVA that is a connection-oriented protocol. The transfer control protocol 472 is a connection-oriented protocol.

Figure 5:
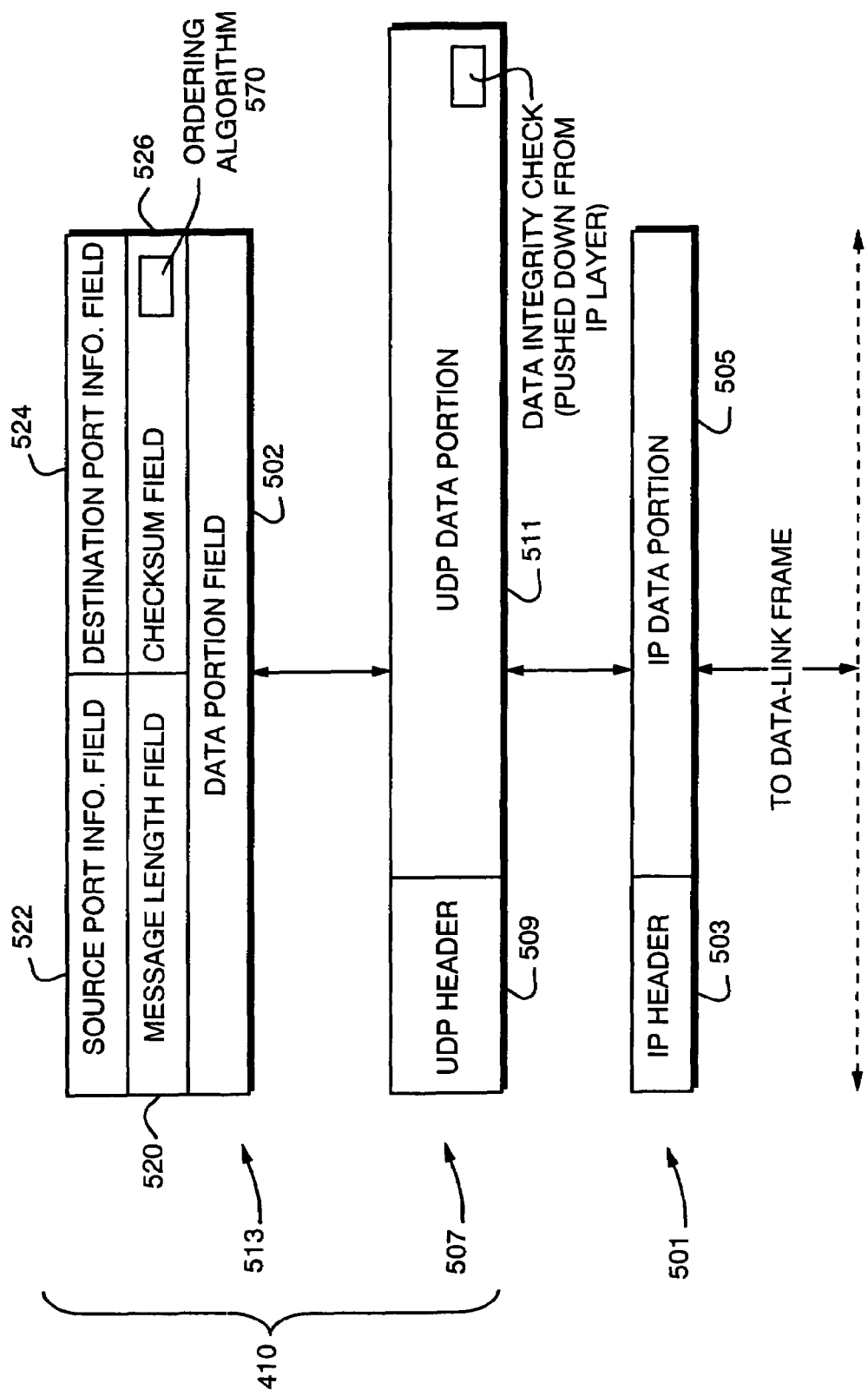
FIG. 5 shows a block diagram of one embodiment of user datagram protocol with value-added (UDPVA) that is used to transfer packets over the broadband network system shown in FIGS. 1 to 3.

FIG. 5 shows one embodiment of user datagram protocol with value-added (UDPVA) that provides a connection-oriented protocol between the BIntU transceiver 110 and the data distribution center 104. In different embodiments, UDPVA data is transmitted between the BIntU transceiver and the data distribution center 104. The receipt of the UDPVA packet at the receiving BIntU transceiver or the receiving data distribution center 104 triggers generation of a return packet as described herein that is transmitted in the reverse direction from the UDP packet. The return packet indicates to the transmitter/sender that the UDPVA packet was received by the receiving BIntU transceiver or data distribution center. UDPVA packets include in the UDP header information 509 the destination address, the source address, and the checksum are included. The UDP header information 509 includes the source and destination port coordinates. The control features are utilized at high level in certain embodiments utilizing a real time clock (RTC), the real time protocol (RTP), and the real time control protocol (RTCP). Synchronization of consistency of travel is then embodied into the data portion of the UDP datagram. An IP packet includes the IP address and the destination address.

As more sophisticated applications (e.g., multimedia or teleconferencing) are being applied in the broadband network system 100, it is highly desired to increase the bandwidth of data being transmitted between the data distribution center 104 and the BIntU transceiver 110. As more bandwidth is provided to the broadband network system 100, more data can be transmitted between the data distribution center 104 and the BIntU transceiver 110 while ensuring a session satisfying a prescribed QOS. In addition to it being desired to use the UDPVA protocol to transmit an increased bandwidth, it is also desired to limit the number of processes required to transmit data. In other words, an increased bandwidth provided by the UDPVA protocol can be translated to an improved signal quality, an improved image that is refreshed more frequently, or an increased number of signals to enable data to be transmitted more efficiently.

As shown in the embodiment of BIntU transceiver 110 shown in FIG. 3A, the compressed video (MPEG) decoder 350 outputs audio information to the scaler 354. The scaler 354 is a hardware component of the codec 302. The scaler 354 functions to either increase the scale, decrease the scale, or maintain the scale of the decoded MPEG images that are either transmitted via the data distribution center 104 to BIntU transceivers or 110 are displayed at the receiving BIntU transceiver 110. The codec 302 interfaces with the API 224 to control the scaling process. The frame buffer 352 outputs to the video object engine 356. The frame buffer 352 reduces irregularities in the image. Data in the frame buffer 352 are dynamically assigned based on the application requirements, such as best user quality. The video object engine 356 includes a flicker reduction unit, and outputs data to the pixel blend 358. The video object engine 356 may be a hardware or software component of the codec 302. The video object engine 356 limits the "jerkiness" or "flicker" that may result during the decoding process. The video object engine 356 thus ensures that the resulting decoded signal is consistent with established guidelines for video quality. The pixel blend 358 receives input from the scaler 354 and the video object engine 356 and blends the various adjacent pixels to provide a less disjointed image. The pixel blend 358 outputs a video signal to the DSP 304.

The codec 302 may also encompasses a 64-bit CPU 390 operating at 300 MHz. The host interface for the codec 302 can be configured either as a PCI interface or as a microcontroller interface. The data path of the PCI interface is a 32-bit wide bus and can sustain a maximum transfer rate of 132 Mbytes per second at 33 MHz. The codec 302 may include an on screen display OSD (not shown) that is designed to overlay graphics layered on top of decoded video. Examples of the graphics include the broadcasting of a channel guide, video playback status and web pages. During the decoding process, flicker filtering is first enabled through the process performed by the OSD, and the video is then mixed into the main picture display.

The ITVC15 embodiment of codec 302 may be used in the broadband network system 100 to provide an integrated technology with high level encoding and decoding functionality. The BIntU transceiver 110 communicates with the codec 302 to ensure that the desired quality in digitally processed voice, video and differing data types is maintained between the data distribution center 104 and the BIntU transceiver 110. The ITVC15 codec 302 provides compressed bit rates of up to 448 Kbits/second. The codec 302 also provides MPEG video encoding and decoding (e.g., MPEG 1, 2, 4, and/or other audio/video compression schemes) that result in transfer rates of up to 720 times 480 at 30 frames per second (fps), or up to 720 times 576 at 25 fps. In addition, certain embodiments of the codec 302 provide for integration options for devices such as smart card readers, an Ethernet 10/100 BaseT port, and V.90 modem module support.

The codec 302 is built upon a robust firmware architecture that supports multiple generalized operational codec units. The operational codec units include the MPEG encoders (including both the compressed audio and compressed video encoders), the MPEG decoders (including both the compressed audio and the compressed video decoders), and the display. In addition, the codec 302 supports code for three different Java processors. These are the video processing unit (VPU), the audio processing unit (APU), and the system processing unit (SPU). These three areas form the nucleus of the high level Java programming necessary to provide a guarantee of operational QOS within the many flexibly enabled functionalities of the codec 302.

Compressed video or audio encoding as well as compressed video or audio decoding requires intense interaction between high-level applications for multimedia convergence and low-level firmware functions. Application function calls from the higher level are met by precision responses at the firmware level that introduce sometimes dynamic parameter allocations depending on the QOS requirements for a session involving a particular application (e.g., an application including teleconferencing, data-transfer, video transfer, etc.). It is these precise requirements that must be preprogrammed based on a flexible architecture, and this is accomplished through the Java programming engine. API function calls serve as the interface between high-level applications and low-level firmware functions. In this way a level of abstraction is generated for hardware details that may have been affected due to direct register calls on hardware whose addresses may have been altered. API functions are also encapsulated into "mailboxes" that serve as the residence for API requests. These mailboxes can be sent via the PCI bus. Mailboxes are 80 bytes in length, and up to 10 mailboxes are supported within the codec 302.

Figure 8:
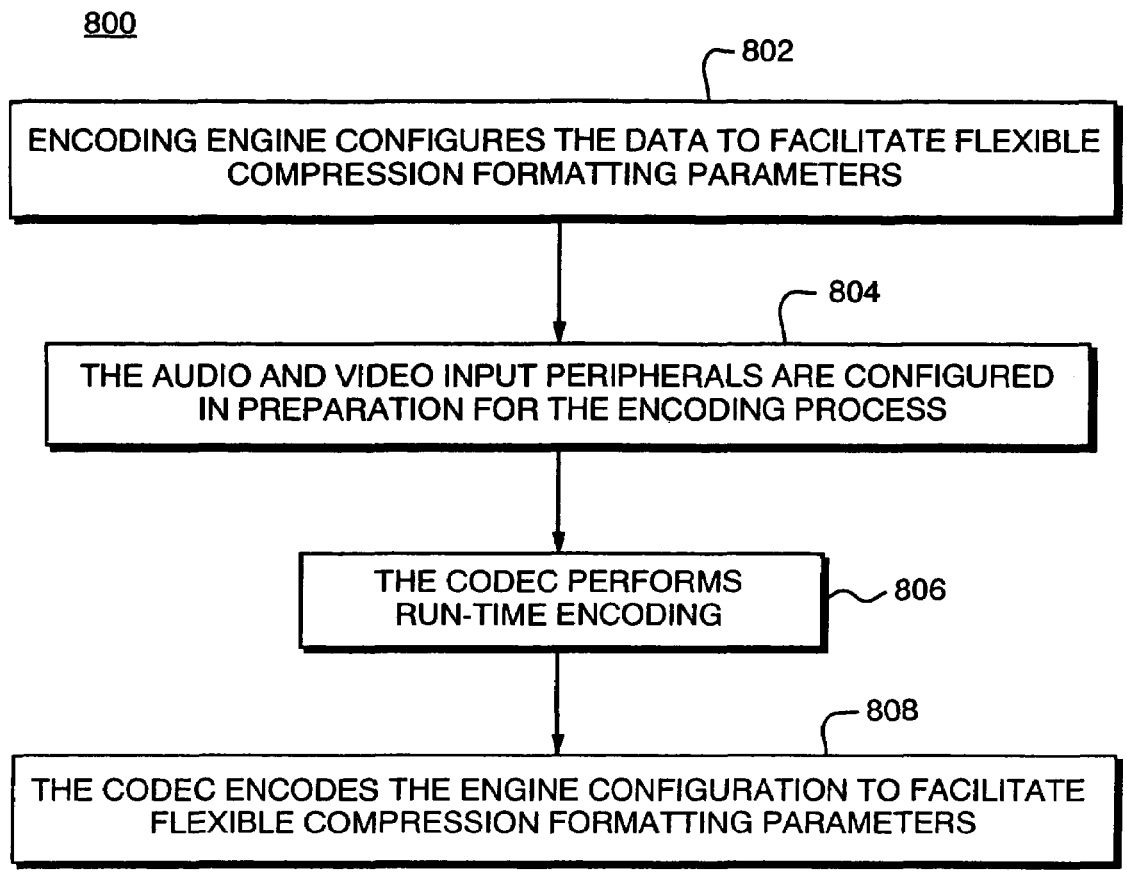
FIG. 8 shows one embodiment of a method performed by an encoder/decoder to encode data in the broadband network system.

One embodiment of a technique by which packets are transmitted between the data distribution center 104 and the BIntU transceiver 110 is encoded is now described relative to FIG. 8. The video encoding session targets the establishment of QOS parameters that enable an efficient session. These QOS parameters target key points that may determine the successful outcome of a functional request and may include video resolution, video frame rate, and video bit rate.

The physical output port serves the data distributed from the codec 302. The data is routed through this port after being multiplexed through the system's multiplexing parameters. The output data port provides data in either a continuous mode or a handshake mode. The continuous mode serves transport stream (TS) formatted data that are used for transmission applications, while the handshake mode is intended for program stream or MPEG stream (MIS) formatted data. Data can be routed through the called API to the PCI interface or through the streaming port.

The functionality of the codec 302 can be seamlessly interfaced for interconnection with digital signal processing devices for application transport layer data. The power of implementing the previously mentioned application options based on the BIntU interface 110 is a direct result of the unique and flexible processing features of the codec 302.

One embodiment of the encoding process enabled by the codec 302 involves multiple distinct steps as shown in a method 800 in FIG. 8. The method 800 begins at step 802 in which the encoding engine configures the data to facilitate flexible compression formatting parameters. The method 800 continues to step 804 in which the audio input peripheral and the video input peripheral are configured in preparation for the encoding process. In step 806, the codec 302 performs run-time control of the encoding session. In step 808, the codec encodes the engine configuration to facilitate flexible compression formatting parameters. The above relate to audio/video capture.

Figure 6A:
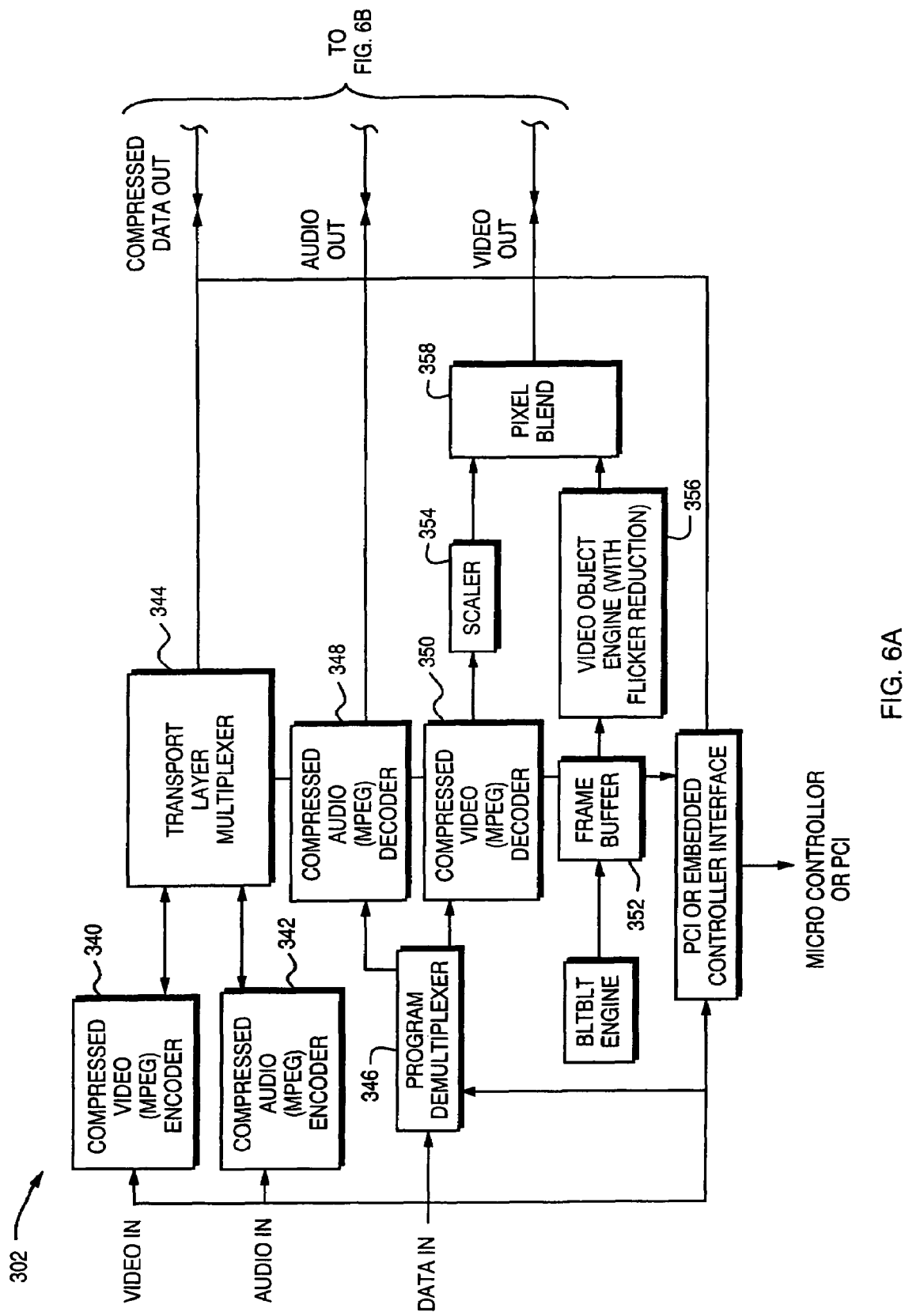
FIGS. 6A and 6B, shows a block diagram of one embodiment of components and associated data flow of one embodiment of the BIntU transceiver shown in FIG. 1.
Figure 6B:
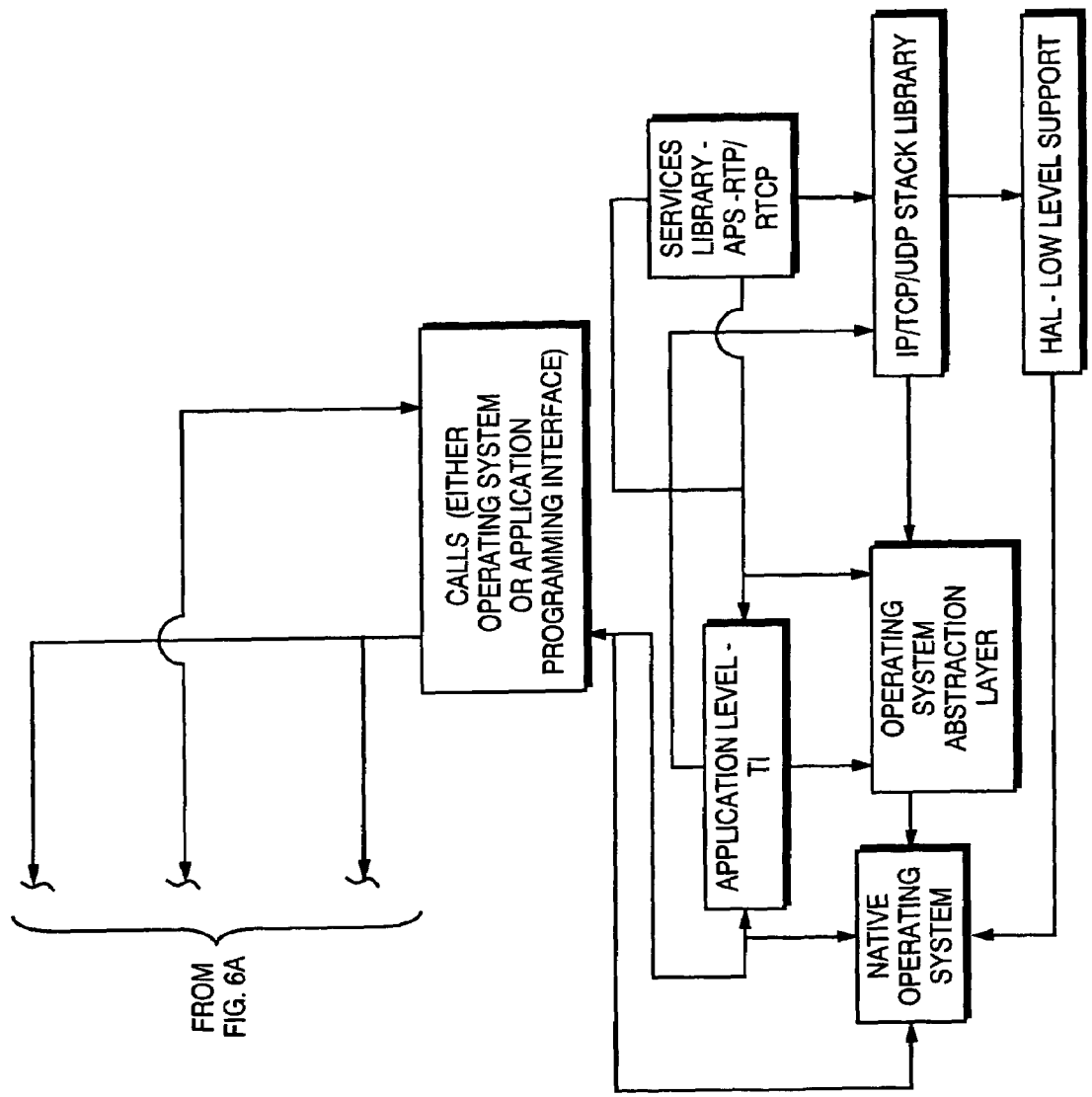

The compressed video (MPEG) encoder 340, the compressed audio (MPEG) encoder 342, and the system level multiplexing unit 343 of FIG. 6A are configured as precursors for an encoding session or a capture process as shown in step 802. A video pre-processing unit includes a video input module, as its driver, to provide extensive pre-processing for a highly efficient encoding session. The pre-processing session involves video capture, including frame rate definition; noise reduction, including an automated process that provides leverage in noise reduction; sharpness control through a control mechanism that enhances the quality of picture according to application requests; scene change detection, which provides the capability to detect scene changes; adjustment of the location of intra-image frames (e.g., MPEG I-frames) to limit the amount of data while reducing fade artifacting; reducing fade detection (which provides automated fade in/fade out functionality for encoding efficiency); providing inverse telecine (which provides the ability to detect repeated fields and create added efficiency by eliminating the encoding of duplicate fields); and providing vertical blanking intervals (VBI) that allow the individual lines of pre-sliced VBI to be captured.

To configure the audio and video input peripherals in preparation for the encoding process as shown in step 804, the encoding process must work with set parameters for audio/visual (A/V) input peripherals. Configuration of these peripherals will determine the audio sampling rate, the video parameters inclusive of the frame rate, frame size, and video (e.g., VBI) capture.

Effective control of the run-time operations of an encoding session that is important to provide consistent QOS is performed in step 806. Through flexibly designed API calls, the run-time control parameters can provide functionality to either start or stop the encoding session. The codec 302 has multiple operational modes for the capture process. These operational modes include: an MPEG capture mode; a video and audio capture mode; an audio only capture mode; a video only capture mode; a video grab mode; and an audio grab mode.

The MPEG capture mode provides normal audio/video capture and compression. The video and audio capture mode captures both provide audio and video capture without compression. The audio-only capture mode targets time-shifting specific radio and non-video applications. No video encoding session is generated during the audio-only capture mode. The video-only capture mode is typically targeted specifically to data broadcasting applications. The audio and video encoders are not used and the encoding process is not started. The video grab mode captures still frames and provides quality compression to a single I-frame. The audio grab mode is used for diagnostic purposes, where a specified number of audio samples are captured within the confines of the allocated internal memory.

In addition to the aforementioned modes of operation, the codec 302 includes additional control or feedback mechanisms that provide status information on an encoding session. The codec 302 also provides decoding functionality. Similar to the encoding process, the decoding process of the codec 302 encompasses multiple steps. Within these steps, the interaction between the data distribution center 104 and the codec 302 must be flawless to continue delivery of consistent QOS to the BIntU transceiver 110. The decoding process includes programming the codec 302 for the decode mode in which the codec 302 is configured to accommodate an optional platform of audio and data formats.

Figure 9:
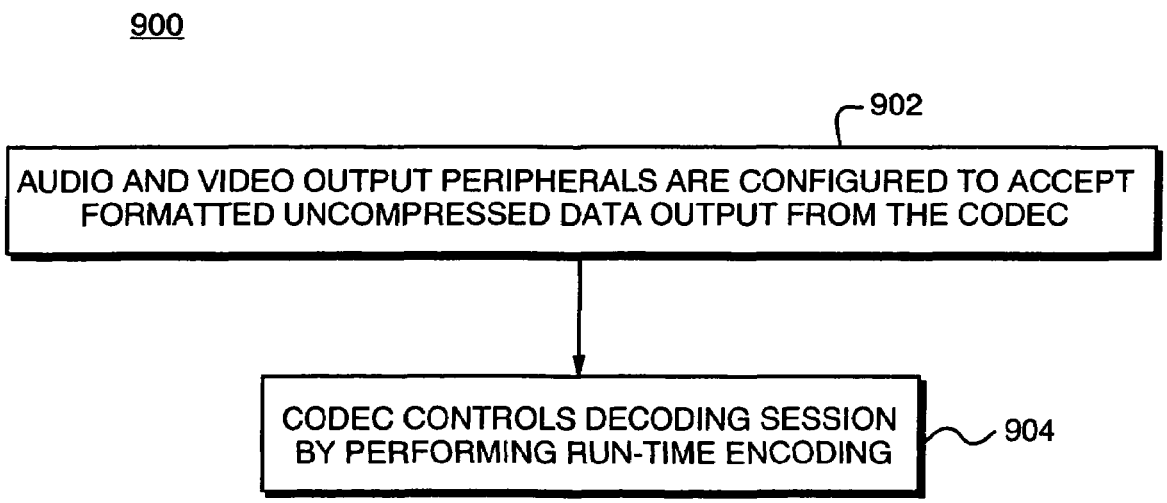
FIG. 9 shows one embodiment of a method performed by the encoder/decoder to decode data in the BIntU transceiver.

One embodiment of the decoding functionality uses the decoding programs of the codec 302 included in the audio/video output peripherals as shown in method 900 of FIG. 9. The audio and video output peripherals are configured in step 902 of method 900 to accept formatted uncompressed data output from the codec 302. The codec 302 controls the decoding session by performing run-time control of the decoding session in step 904 of method 900.

To program the codec 302 to operate in the decode mode as shown in step 902, data is input to the codec 302 through either the PCI interface port or the MPEG streaming data port. Data is provided to the codec 302 in either the continuous mode or the handshake mode, similar to the functionality of the encoding process. An API is generated to determine the mode of data input. Data can be routed either through the PCI interface port or the MPEG streaming data port, respectively depending on the whether data is input to the codec 302 through the PCI interface port or the MPEG streaming data port, respectively. The codec 302 can decode compressed data that has been multiplexed in several ways by different applications. For instance, transport streams, elementary streams and MIS streams can all be accommodated by the codec 302 regardless of the timing or synchronization process by which the data was encoded.

To program audio/video output peripherals, information regarding the contents of a bit stream is used as a control parameter in setting up the output peripherals for a decoding session. Using that information, there are two methods for configuring the audio/video peripherals. One method utilizes the codec 302 to complete parsing functions. Unfortunately, using the codec 302 for parsing increases the latency for packet transmission. The second method for configuring the audio/video output peripherals dictates that the driver completes the parsing functions. Using the driver limits or eliminates the latency.

There are many API-driven states that affect the decoding process. The states include start, stop, pause, fast forward, step and slow motion. Another control area is the graphics control engine that works closely to impact the OSD. As mentioned in the description of the encoding process above, the OSD works to produce graphics data such as an on-screen channel guide, video playback status, buttons and icons.

One important area for decoding is the video output control. This control feature enables several key modes of operation. The modes of operation includes the video display mode, the video scaling mode, and the event notification mode. The codec 302 provides a seamless interface for interconnection to almost any device. This methodology, which integrates the best functional platforms to maintain consistent QOS in application deployment areas, is driven by this seamless option. The resulting transportation of data streams toward a signal processing corridor will consequently be maintained under the umbrella of consistent QOS.

The video/audio packet is transmitted from the codec 302 to the DSP 304 directly to the network access ports 310, as shown in FIG. 3. The TCP/IP stack 374 transmits information packets while limiting the combined codec 302 and DSP 304 from operating any higher than the physical layer 404, as shown in FIG. 4. The TCP/IP stack 374 provides digital signal processing services and utilizes an abstracted operating system layer to provide TCP/IP stack 374 functionality. The codec 302 provides encoding and decoding services. All services accomplished through the codec 302 are based on the data-link layer 406 and physical layer 404 (in the OSI model). All other areas on the OSI protocol layers are serviced through the services provided by the TCP/IP stack 374 (one embodiment is fashioned as a chipset).

By comparison, in prior-art systems, the information output from the codec 302 to the DSP 304 traditionally passes via a separate computer processor 306. Processed packet is then forwarded from the computer processor 306 to the network access ports 310. As such, the prior-art systems must formulate the audio/video information packets to a form that can be handled by the computer processor 306. The duration that the packets are processed in the computer processor in prior-art systems adds considerably to the latency. Allowing the information packets to be maintained within the physical layer 404 in certain embodiments of the present invention allows for the form of packet as indicated in FIG. 5, described herein, to be used.

Considering FIG. 3 (including FIGS. 3A and 3B) initially, the function calls from the user inputs 308 via the computer processor 306 are generated and forwarded via the TCP/IP stack 374 to the DSP processing platform 370. These function calls may be generated within the data distribution center 104. The function calls may alternatively represent signals transmitted from a BIntU transceiver 110. The function calls are then forwarded from the DSP processing platform 370 to the appropriate portion of the codec 302. The codec 302 modifies the function calls to allow the codec 302 to operate in the manner desired. Based upon the new configuration of the codec 302 and the DSP 304 as disclosed, video, audio, and other data is transmitted from the codec 302 to the DSP 304 and thus is translated directly into the information packets that can be directly applied to the network access ports 310.

Therefore, the TCP/IP stack 374 is utilized by the routers to route the packets using the actual IP address. Using the source port packet field, the route of the packet can be determined. The TCP/IP stack 374 provides network access, etc., that is maintained to the adjacent pier and that the representation of the IP diagram are in the UDP packet. The routing path over which the packets are transmitted between the BIntU transceiver 101 and the data distribution center 104 are transparent to end user BIntU transceivers 110.

The data distribution center 104 is concerned with providing data information transmission between the BIntU transceiver 110 and the data distribution center 104. To accomplish this packet transmission, the data distribution center 104 transmits a copy of the packet and saves a copy of the packet. The copy of the packet that the data distribution center 104 saves serves as a monitor of an encoding or decoding session, but does not act as the encoding or decoding session. The copy of the packet that the data distribution center 104 transmits serves as the encoding or decoding session. The data distribution center 104 also ranks the priority of multiple routes between the data distribution center 104 and the different BIntU transceivers 110.

2. User Datagram Protocol with Value-added (Transfer Layer Protocol)

One embodiment of user datagram protocol with value-added (UDPVA) is described in this portion. UDPVA is a connection-oriented version of the UDP protocol, the latter being a connectionless protocol. Certain aspects of UDP, as well as UDPVA, are described in this portion.

UDP and UDPVA transfer layer 410 protocols that are used to transmit data from one end user to another end user within the transfer layer 410. Transfer control protocol (TCP) and user datagram protocol (UDP) are two standard transfer layer protocols used for Internet connections. TCP is a connection-oriented protocol and UDP is a connectionless protocol. Instead of using TCP for data transmission, one embodiment of the present invention uses a modified version of UDP that includes value-added information. The UDP with value-added (UDPVA) allows for slight frame manipulation of the UDP packets to integrate the value-added information, such as header information 509, within the UDP packets. The value-added information included in the UDPVA packets is added to the standard UDP packet (due to the uncertainties of signal transmissions) to provide for some applications an indication to the data distribution center 104 that the BIntU transceiver 110 received the signal. The value-added information is transmitted within the UDP packets in the broadband network system 100 from the data distribution center 104 to the BIntU transceiver 110.

UDP is a connectionless protocol. UDPVA may be considered as modifying the connectionless UDP to a connection-oriented protocol. UDP is considered a very light protocol since UDP packets do not require a lengthy header information. UDP is used as one embodiment of medium for data. UDP utilizes the underlying IP header information to send messages from one end user to another. UDP, however, provides header information as part of its encapsulation. That header information includes the source port information field and the destination port address field and is divided into four 16-bit fields that contain the message length and a UDP checksum.

The embodiment of IP packet 501 shown in FIG. 5 includes an IP header information 503 and an IP data portion 505. The IP packet 501 is the form of packet in which data is transmitted between end users over the Internet. The IP data portion 505 includes a UDP datagram 507. The UDP datagram 507 includes a UDP header information 509 and a UDP data portion 511. The embodiment of UDP datagram 507 shown in FIG. 5 is envisioned to be a relatively light protocol, and as such transmits packets of a size of approximately 500-plus bytes that may be transmitted and/or processed quickly. The UDP data portion 511 includes UDP datagram contents 513. The UDP datagram contents 520 include a data portion field 502, a message length field 513, a source port packet field 522, a destination port packet field 524, and a checksum field 526. The UDP header information 509 is pushed out of the IP layer 408 during normal operations of the application.

The UDP datagram contents 513 include the packet that is used to route data between end users. The data portion field 502 includes the data that are being transmitted, e.g., audio and/or video packets. The source port packet field 522 is the port address of the source application protocol. The destination port packet field 524 is the port address of the intended recipient application protocol. The source port packet field 522 is optional. The message length field 520 is the total number of octets in a complete UDP datagram 507, including the UDP header information 509. The checksum field 526 is optionally used to provide a mechanism to announce the delivery of a datagram back to its source. The use of the checksum field 526 provides a guarantee of notification of delivery. The checksum field 526 is computed through an accumulation of a 16-bit ones complement sum of the UDP packet.

The routing information is handled as part of the DSP 304. All the interfaces from one end user represent the codec 302, the DSP 304, and the routing. The appending of the UDP header information 509 to provide for the routing of the packets occurs in the DSP 304. The TCP/IP stack notification that is an OSI layer 3 (e.g., the IP layer 408) operation also occurs in the DSP 304. The routing is accomplished at the IP layer 408. The routing from another end user occurs in the data distribution center 104. Therefore, the routing header information can be provided if the data distribution center 104 and/or the BIntU transceiver 110 knows the system configuration and the condition of the network at the destination. The link state protocol (e.g., OSPF or MOSPF) establishes links to accomplish the routing between routers. A routing path is thus established from the data distribution center 104 via the access networks 108 and core network 106 to the BIntU transceiver 110.

In FIG. 5, the combination of the UDP datagram 507 and the UDP datagram contents 520 can be viewed as the transport layer 410, depicted in FIG. 4. The transport of the UDP datagram in the transport layer 410 allows additional control over the packets. In most prior-art networks, control is applied at the application level using such protocol as RTP and RCPT. The broadband network system 100 allows for the adding of additional controls in the transport layer using the UDPVA protocol that allows for more control and more integrity of BIntU transceiver 110.

The routing information of the UDPVA packets can be integrated as the data integrity check 551 included the UDP data portion 511. In one embodiment, the data integrity check 551 includes 8 bytes. The data integrity check 551 thus represents a relatively small amount of data. The data integrity check 551 acts to place the control in the transport level 410. The data integrity check 551 may be viewed as a protocol that provides embedded functionality within the UDPVA packet. The control ensures that there is a degree of integrity of the transmitted UDPVA packets since the UDPVA packet is encapsulated. Once the transmitted UDPVA packets are received, the request will act as a buffer.

The overhead of the UDPVA packets is relatively small compared with other transfer layer protocols since UDPVA packets are basically modified UDP packets. The 8-byte data integrity check 551 section of the packet presses transfer of the UPDVA packets down to the transport layer from the application layer.

The TCP/IP stack 374 in itself is small and relies on the extremely rapid transfer of audio and/or video packets. The TCP/IP stack is not more than, e.g., 512 Kbits, and as such there is very quick data transfer through the TCP/IP stack 374. Small portions of the TCP/IP stack 374 can be used for control since there is sufficient space in the TCP/IP stack to establish control.

The first hub in the access networks 108 is the network access router 272, as shown in FIG. 2A. The network access router 272 looks at a multimedia access table, an access table, or a routing table and determines the optimal route based on a partnership of the tables, as described below. The switches, routers, and hubs in the broadband network system 100 can be considered as operating together in partnership. The partnership of routing tables stored in the routers identifies the shortest route to an end user. The partnership of tables is pre-established during set-up because once a connection is established, a virtual connection is provided between the BIntU transceiver and the data distribution center. The data forming the return packets are transmitted from the BIntU transceiver 110 to the data distribution center 104, as determined in an established routing table. The combined routers then provide a connection as per the routing table. Thus, UDPVA is a connection-oriented protocol.

During operation, once an end user located at a BIntU transceiver 110 logs onto, or starts to use, the virtual circuit is established between the BIntU transceiver 110 and the data distribution center 104. Once the virtual circuit is initialized, UDPVA data can be transmitted between the BIntU transceiver 110 and the data distribution center 104. The first UDP packet that travels along the virtual circuit registers a preferred path onto the routing table of the router. For subsequent UDPVA packets being transmitted from the BIntU transceiver 110 to the data distribution center 104, the routers can derive the routing information derived from the location of the source, and thereby route the return packets to the source. The packets will then be transmitted through to the source that is the appropriate destination. At the data distribution center 104, the information includes a request for some prescribed amount of bandwidth. There is a maximum transfer (MTA) rate of data being transmitted to between that BIntU transceiver 111 and the data distribution center 104. Therefore, the data distribution center 104 and the BIntU transceiver 110 each know the network bandwidth allotted to transfer datagrams. Once the route is established, the subsequent information searches for an address using routing tables utilizes the routing setup by the initial packet. The routing is thus temporally set up and the connection on the network is cleared. The routing of the first UDPVA packet creates the virtual channel (or pipe) for datagrams to be used to be transferred to that end user.

To create the interface that allows for a desired amount of data to be transferred between the BIntU transceiver 110 and the data distribution center 104, the source is transmitted to establish the required devoted bandwidth to provide the QOS for a specific application provided by the data distribution center 104. Because the required bandwidth may vary, the bandwidth is dynamically controlled. The BIntU transceiver 110 receives the data, but the destination has been coordinated by receiving the data. As such, a data channel or virtual channel is considered as established between the data distribution center 104 and each active BIntU transceiver 110. The connection between the data distribution center 104 and each of its associated BIntU transceivers 110 is recorded in the routing table maintained by the data distribution center 104 or the routers. The establishment and maintenance of the channel results from recording the connection at each router included in the channel.

This establishing of a channel does not establish a wide area of connectivity outside the Internet. The channel may be established using so-called routing trees. Certain channels stored in of the network that define the channel may be pruned after a period of inactivity. The pruning, in effect, removes those routing paths from the routing table that are not the shortest. The use of UDPVA increases the effective bandwidth of the broadband network system 100 because of the ability of the broadband network system 100 to transfer data very rapidly using the TCP/IP stacks 374 that output data directly to a network node. The power of the interface provides an increase in the transfer rate of the data information.

Java processes (i.e., processes that use Java programming language) are utilized to provide one embodiment of connection that provides for data transfer between the data distribution center 104 and the BIntU transceiver 110. Though the return packet is created using Java, it is envisioned that any application that can be used to create the return packet that indicates to the data distribution center 104 that the BIntU transceiver 110 has received the UDPVA packet is within the scope of the present invention. The return packet can be referred to as an "echo" or "ping." Java can be programmed as a web browser in the TCP/IP stack 374 within the UDPVA packets. Java supports a wide variety of platforms, operating systems, and application programs. Java processes control the receipt of packages between source and destination.

Figure 10:
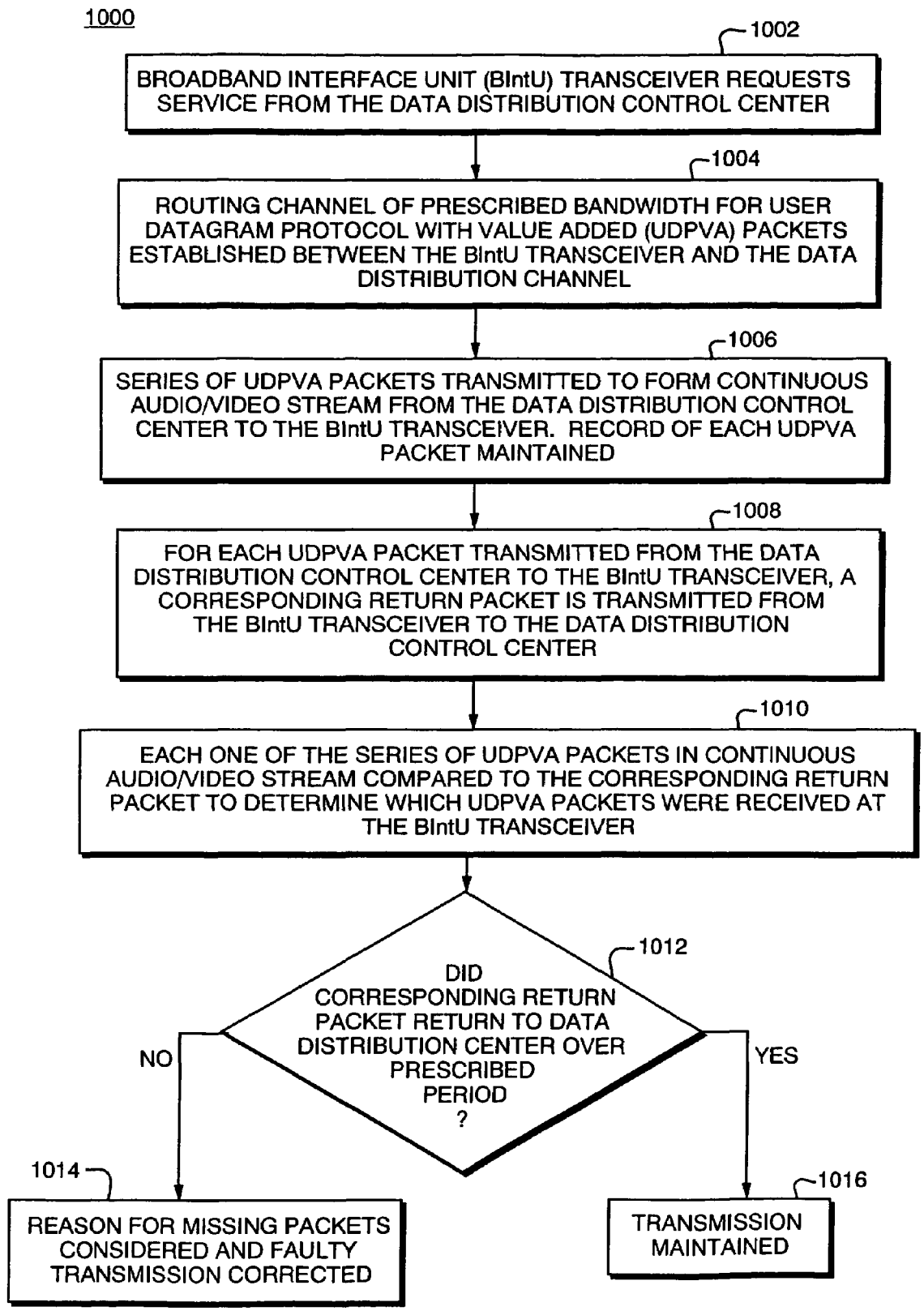
FIG. 10 shows one embodiment of a method of transmitting UDPVA packets within the broadband network system of FIG. 1.
Figure 12A:
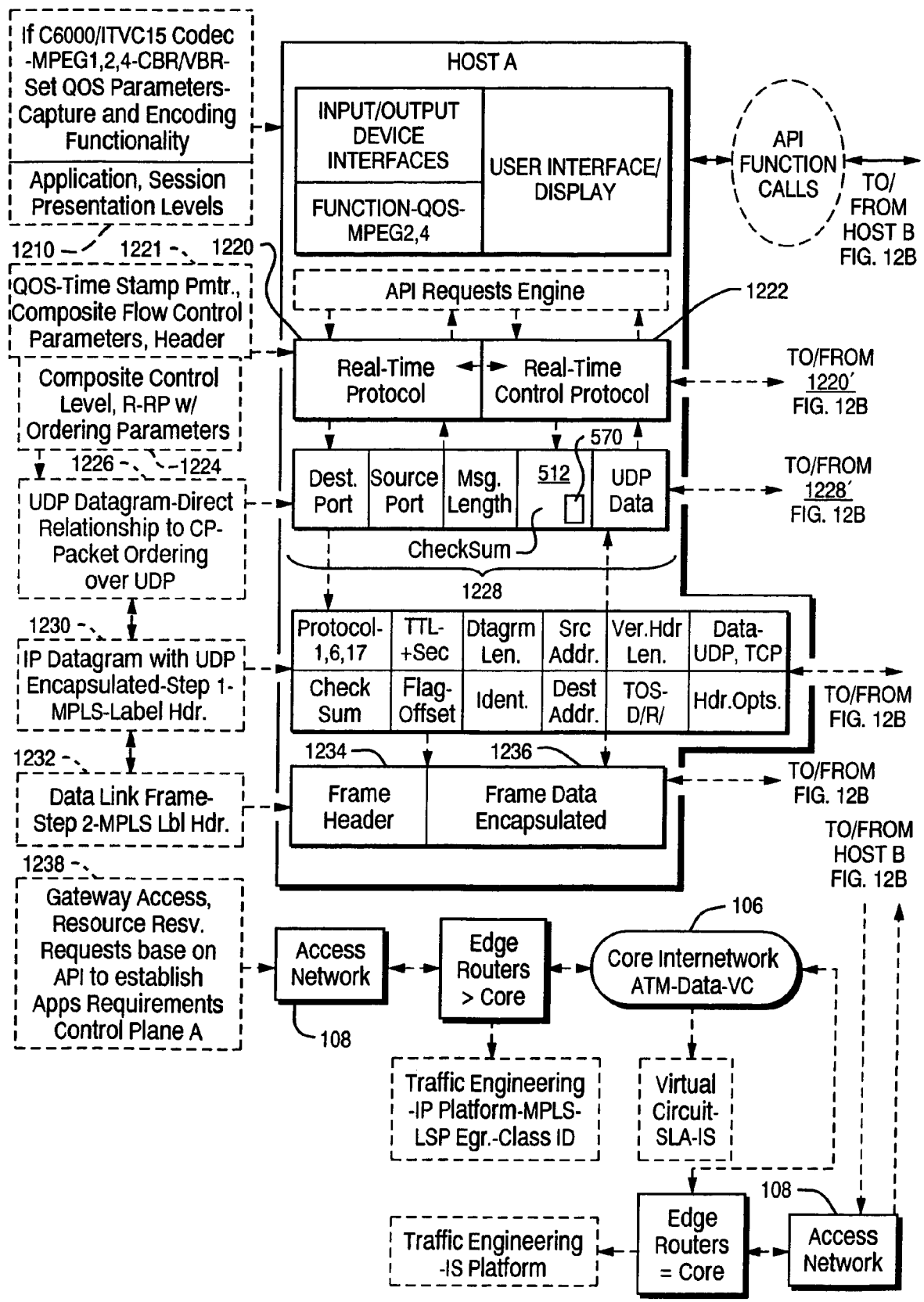
FIG. 12 shows one embodiment of a flow diagram of the data flowing from one host to another host between one BIntU transceiver and either another BIntU transceiver or a data distribution center.
Figure 12B:
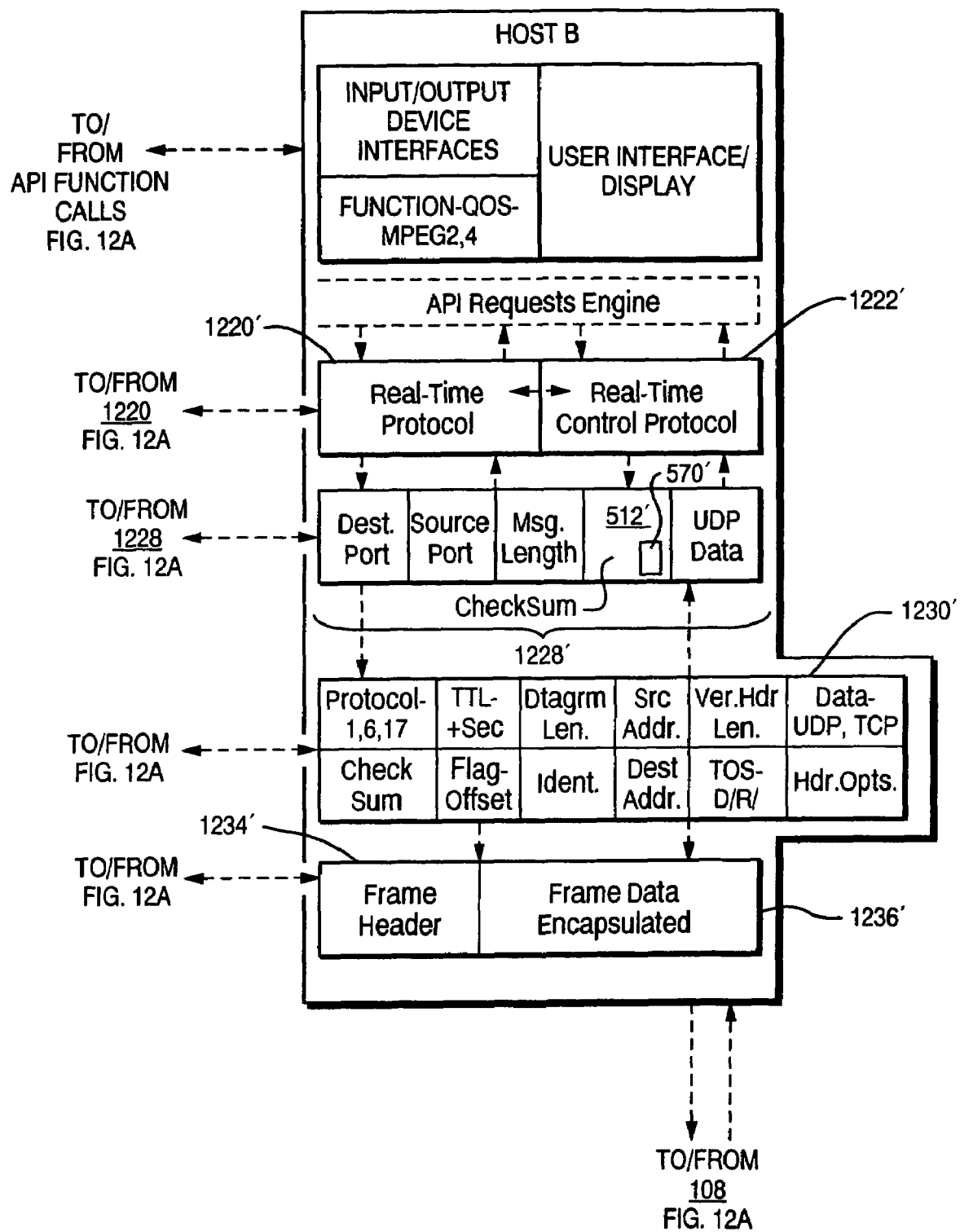

There are a variety of embodiments of the broadband network system by which the timing of the receipt of a UPD package can be controlled. Java can control timing of a receipt through a checksum 526 as shown in FIGS. 5 and 12 (through the TCP/IP stack itself) and can indicate when the UDP packet has arrived. The checksum 526 includes an ordering algorithm 570. The ordering algorithm orders the packets at the receiving BIntU transceiver 110 or the receiving data distribution control device 104 based on the timestamp of the UDPVA packet. UDP packets do not necessarily arrive at a receiving BIntU transceiver in the correct order. The checksum 526 is therefore used to control the ordering of the received UDPVA packets, as well as ensuring that the transmitting order of the return (ICMP) packets agree with the transmitting order of the original UDPVA packets. Another way to control the timing of the receipt is by using a Java applet created as the transmitted packet is received on the application side. One embodiment of a method 1000 that uses the Java applet to ensure correct transmission of packets is shown in FIG. 10. The method 1000 begins with step 1002 in which the BIntU transceiver 110 requests service from the data distribution center 104. The method 1000 then continues to step 1004 in which the routing channel of a prescribed bandwidth for UDPVA packets is established between the BIntU transceiver 110 and the data distribution center 104. This routing channel is established using the routing tables in each of the routers that are arranged along the channel. As such, any packet routed through an input leg to the router with the corresponding destination address will be forwarded to the output leg of the corresponding destination address.

The method 1000 continues in step 1006 in which a series of UDPVA packets are transmitted to form a continuous audio/video stream from the data distribution center 104 to the BIntU transceiver 110. A record of each UDPVA packet that has been transmitted from the data distribution center 104 to the BIntU transceiver 110 is maintained at the data distribution center 104. The method 1000 continues to step 1008 where for each UDPVA packet transmitted from the data distribution center 104 to the BIntU transceiver 110, a corresponding return packet is generated from a Java applet and the return packet is transmitted to, and received by, the data distribution center 104. The return packet is transmitted from the BIntU transceiver 110 to the data distribution center 104.

The method 1000 continues to step 1010 in which each one of the series of UDPVA packets in the continuous audio/video stream is compared to the return packets to determine which UDPVA packets were received at the BIntU transceiver 110 for each UDPVA packet. The broadband network system 100 operates under the assumption that a certain number of UDPVA packets will be lost. The QOS provided by the broadband network system 100 is maintained, even if a number of packets are lost, by the use of such compression techniques as MPEG. For example, if a packet including an MPEG I-frame is lost, then the particular packet relating to that I-frame is not provided to the BIntU transceiver 110. Provided that the lost I-frame is relatively small compared to the overall image, using the packet from the previous I-frame will be a perfectly satisfactory substitute for the lost I-frame. As soon as the next complete I-frame is transmitted, a complete image will be displayed using technology used in video compression such as MPEG.

MPEG, and other associated video compression technologies, allows for a relatively small number of frames included as frame information to be lost without appreciably detracting from the quality of the image provided to the BIntU transceiver 110. However, if a considerable number of frames are lost, the resulting image will degrade, and the image provided to the BIntU transceiver 110 will not accurately reflect the image (or audio) transmitted from the data distribution center 104. A loss of a large number of frames or frame information (encapsulated within the UDPVA packets) will be indicated by a considerable number of return packets not being received by the data distribution center 104 from the particular BIntU transceiver 110.

The method 1000 continues to step 1010 in which each of the series of UDPVA packets being transmitted from the BIntU transceiver to either a remote BIntU transceiver or a remote data distribution center in a continuous audio/video stream is compared to the corresponding return packet to determine which UDPVA packets were received at the BIntU transceiver 110. This process is performed for each UDPVA packet transmitted from the data distribution center 104 to the BIntU transceiver 110. The method 1000 next continues to decision step 1012 in which the broadband network system 100 determines whether a suitable number of return packets returned to the data distribution center 104 over the prescribed period to indicate that satisfactory service is being provided to the BIntU transceiver 110. If the answer to decision step 1012 is yes, then the method continues to step 1016 in which the transmission of the UDPVA packets is maintained. Following step 1016, the method 1000 continues to step 1006 and the method 1000 is performed once again.

If the answer to decision step 1012 is no, then the method 1000 continues to step 1014 in which the reason for the one or more missing packets is considered, and the faulty transmission and/or reception of the packets is corrected. Such correction can be performed automatically or manually, using known network management techniques. If the reason for the missing packet(s), as determined in step 1014, can be easily corrected and/or the broadband network system 100 has corrected itself so that a regular stream of UDPVA packets is being transmitted and received as indicated by the return packets, then the transmission is maintained. If, by comparison, no return packets are received to indicate that UDPVA packets are not being received and/or the reason for the malfunction of the broadband network system 100 that resulted in the return packets not being returned is not understood, then a more complete analysis of the broadband network system may be performed.

The method 1000 can be performed automatically with a computer tool, such as a network management tool, that would be included in the broadband network system 100. Alternatively, the method 1000 can be performed manually by, e.g., alerting a human network operator. By using Java a request reply protocol is created at the application layer. Java already includes the classes to perform a dual operation and perform a request sent. In Java, the network processors form an abstraction layer operating system. Whenever the data distribution center 104 transmits a UDPVA packet to a BIntU transceiver 110, associated packet is returned to the data distribution center 104 from the BIntU transceiver 110. The associated packet returning to the data distribution center 104 from the BIntU transceiver 110 provides proof to the data distribution center 104 that the BIntU transceiver 110 has received the UDPVA packet.

With Java, when the UDPVA packet is received at the receiving BIntU transceiver 110 or receiving data distribution center 104, a return (ICMP) packet is created and sent back to the data distribution center 104. The UDPVA packet may thus be considered as a request packet. Therefore, return packet is transmitted for each application that is transmitted by the data distribution center 104 and received by the BIntU transceiver 110. In certain embodiments of BIntU transceivers 110, the maximum packet size that could be transmitted from the codec 302 may be, e.g., 188 bytes. This packet size is sufficient in terms of streaming and the quality of streaming and how fast it streams based on the processor. On the codec 302, the DSP 304 can be used to increase the packet transfer rate to, e.g., 132 megabytes per second. The codec 302 creates a stream of packets, and then encapsulates the data included in the stream of packets through the DSP 304 into the IP packet being transmitted out of the TCP/IP stack 374 from the codec 302. The term streaming is not to be confused with the term streaming as used relative to video transfer on computers. With video, the term streaming relates to a data compatible stream.

At the application layer, the specific application is effectively being transmitted to the end user. The data distribution center is transmitting video and other high bandwidth data. The transfer of the return packet does not slow down the overall operation of the broadband network system 100. The return packet can be viewed as creating a connection using a call back. By transmitting the return packet, the virtual channel (e.g., a pipe) is established with some bandwidth available to transmit data from the data distribution center to the BIntU transceiver. The router in one embodiment uses Java, Java Beans, or some other similar computer program to transmit applets that can be run by a variety of different computers over a distributed computer system. The data distribution center transmits the applet to the BIntU transceiver that indicates to perform a computer operation.

Performing an operation in Java includes multiple basic steps as indicated in the embodiment of FIG. 10. The first step as shown in 1006 is to request a reply (i.e., the return packet) be transmitted from the BIntU transceiver 110 to the data control center 104. Another step is to request the name or identification of the end user at the BIntU transceiver 110. In another step, the return packet is transmitted from the BIntU transceiver 110 to the data control center 104 as shown in step 1008. Java's operation in which an applet is generated at the BIntU transceiver 110 occurs at the application layer. During the generation of the applet, a datagram is produced that drops the packet to the UDPVA data area. With Java included in the UDPVA packet, that applet works closely with the transfer level because UDPVA is sending the data and the source port. Java works in sockets. In Java, sockets and ports work together and in parallel to provide the addressing functionality between the data control center 104 and the BIntU transceiver 110. Specific ports that utilize the UDPVA packets are referred to as sockets. Assume that a specific port is devoted to a specific router. The socket works through the port. The method 1000 is used to establish socket connection to that port connection. The use of sockets and ports is well known in the UDP protocol, and will not be further detailed. UDPVA protocol interfaces with sockets and packets in a manner similar to the UDP protocol. However, UDPVA packets may also include the functionality of the Java applets integrated in the UDPVA packets that are used to generate the return packets, as described herein. The checksum is uses by an algorithm to check the information in the packet after transmission to determine if it is consistent with the information in the packet prior to transmission.

This checking of the information in the packet is typically performed using application layer programs. The indicator is included to compute the checksum. The UDPVA establishes if the checksum is non-zero, and if so, it sends out the checksum. If the checksum value at the transmitting BIntU transceiver 110 or the data distribution center does not match that at the destination BIntU transceiver 110, the packet is dropped and no acknowledgement (return packet) is returned. On the other hand, if the checksum at the transmitter matches that at the BIntU transceiver 110, then the BIntU transceiver 110 transmits the return packet. That return packet is the indicator to indicate that a suitable packet transmitted from the data control center reached the BIntU transceiver 110 in the UDPVA protocol. The use of the return packet is not necessary because it involves a small amount of overhead, and it is desired that the UDPVA packet be as light as possible. In certain embodiments of the broadband network system 100, only certain UDPVA packets generate return packets to limit the overhead.

The construction of the UDPVA packet performs an additional function in UDPVA, by acting at a higher level as a source for value-added information. The construction of the UDPVA packet which would bring about added value to UDP is a result of the way the application layer is used to transmit and receive each UDPVA packet. The UDPVA packet is processed at the BIntU transceiver 110. To generate such a UDPVA stream of packets as occurs in step 1002, a function call originates from the BIntU transceiver 110 to the data control center 104. The function call requesting a signal (e.g., video service) is transmitted from the computer processor 306 via the DSP 304 to the codec 302. The codec 302 then tunes the received video, audio, and other data within the respective compressed video (MPEG) encoder 340 and compressed audio (MPEG) encoder 342 to form signal packets including the requested data (e.g., a video/audio program) that are transmitted to the transport slayer multiplexer 344. The received signal packets are appropriately filtered at the compressed video (MPEG) encoder 340 and the compressed audio (MPEG) encoder 342 to transmit the appropriate signal.

The bandwidth of the virtual channels are dynamically allocated using the ICMP packets during set-up. The UDPVA packets (including the data and value-added information) are formed as separate data streams out of the transport layer multiplexer 344. The distinct audio, video, and other data streams including the value-added information are then transmitted to the DSP 304. The data streams are initially processed in the DSP processing platform 370. The DSP processing platform 370 may provide a range of signal processing services. The TCP/IP stack 374 provides a platform for high speed computation of signals being generated through the encoding and decoded processes or the code 302. The DSP processing platform 370 may also provide TCP/IP stack 374 services that filter the necessary packet streams for transport over the network. The DSP processing platform 370 then outputs a separate video bitstream, audio bitstream, and data bitstream to the TCP/IP stack 374.

The flow of the majority of data within the processor portion 228 is generally from the data control center 104 to the BIntU transceiver 110 since this represents the direction that the video program is transmitted. The rate of data transfer of UDPVA packets is identical to that of UDP packets (since UDPVA packets are identical to UDP packets except for the embedded value added information), and higher than that of TCP packets. Transferring the UDPVA packets can be considered as identical to transferring UDPVA packets UDPVA for purposes of this discussion. The signal that is sent to the TCP/IP stack 374 is formed from consistent UDPVA packets that are allocated properly. The TCP/IP stack 374 uses the same timing and synchronization for UDPVA packets as for UDP packets to ensure that the UDPVA packets are properly transmitted. The UDPVA packets are transmitted directly through, e.g., the Internet to the BIntU transceiver 110.

A request for a particular service is transferred from BIntU transceiver 110 in the form of a function call. The function call originates from the BIntU transceiver 110 via user inputs 308 and the computer processor 306 to the DSP 304, and is received by the codec 302. The function call requests a packetized stream of data encapsulated as a UDPVA packet. A base stream including UDPVA packets is transferred from the codec 302. The DSP 304 is configured to look for either UDPVA packet or TCP packets. Transferring the packets via the TCP/IP stack 374 directly as information packets to the network access ports 310 to the network results in the packets being transferred at the transfer or data link layers.

A connectionless connection is traditionally used for audio and/or video packets, and therefore the DSP 304 will process UDPVA packets in a manner similar to UDP packets rather than TCP packets. The embodiment of broadband network system 100 using UDPVA packets, as shown in FIG. 10, represents one embodiment of connection oriented protocol. The value-added information (e.g., the Java applet) encapsulated in each UDPVA packet triggers the return packet that indicates, upon receipt at the transmitting BIntU transceiver 110, that the packet has been delivered to and processed at the receiving BIntU transceiver 110 or the receiving data distribution center. Such value-added information is a function of the Java program that add control to the type of information that is being sent. The value-added information is included in the UDPVA packets that are stored in the TCP/IP stack 374. The value-added information is then transmitted from the TCP/IP stack 374 as information within the UDPVA packets to the network access ports 310. The value-added information should not be considered as an acknowledgement (ACK) because the returned value-added information cannot cause a retransmission of a replacement packet in a sufficiently short time to allow the ACK to travel round-trip across the network to perform the typical ACK control function. Though the embodiment described in this disclosure characterizes the BIntU transceiver 110 as transmitting only UDPVA packets to the data control center 104, it is envisioned that in a video/audio signal stream, the UDPVA packets may be interspersed with standard UDPVA packets. For example, one of the two, three, or ten packets may include a single UDPVA packet that triggers the return packet while the remainder of the packets is UDP packets that do not trigger return packets.

In one embodiment, the BIntU transceiver 110 will be registered with the service provider when the associated software for the BIntU transceiver 110 is downloaded into the computer. The service provider can monitor usage by the BIntU transceiver 110. The bandwidth provided would be dynamically established once a BIntU transceiver 110 signs on the network. The service provider receives information that can be used relative to metering the use at that BIntU transceiver 110. As such, the software in the BIntU transceiver 110 will communicate with the service provider and indicate that the BIntU transceiver 110 is being used. When a computer that includes the BIntU transceiver 110 is booted up, the computer registers back at the data control center 104 of the service provider.

The BIntU transceiver 110 could be configured in one embodiment as a PCIO card that can be used by a laptop personal computer, computer, or set-top box. The BIntU transceiver 110 may include a video card so that the end user will be able to communicate to the data control center 104 and/or a remote BIntU transceiver. The data control center 104 will authorize, and usually know how long the end user will be on, a particular session from a particular BIntU transceiver 110. Also, the service provider may be configured to act like a cable company to the BIntU transceiver 110 which can then observe different video channels.

If a client (e.g., a company organization that is associated with multiple BIntU transceivers 110) of the service provider wants to perform video training, video communication, or some other video application, the client can send to the videos to the service provider in certain embodiments of broadband network system 100. The service provider will manage the videos, and will thus be able to push the video content out to the BIntU transceiver 110 (and thus to any employee, customer, etc. of the client who desires access to the video application). As such, third party companies or organizations can use the data control center 104 to distribute confidential or non-confidential video or other data to its employees or members.

Maintaining QOS begins once the packet is created on a digital or packet switch type network. Once the appropriate bandwidth is allocated for a certain type of application (and that is established and that BIntU transceiver side) it is important to consider how the packet is transported. The transmission of the UDPVA packets establishes the QOS (the QOS is initiated once the BIntU transceiver 110 initiates an application). The formatting for the QOS for data transfer is set up on the signal side in one embodiment. At the commencement of service, assume the broadband service allocates a prescribed number of megabits to the virtual channel devoted to the application as required by the selected application.

If, during use, the BIntU transceiver 110 requires more bandwidth to, e.g., receive a signal effectively or run an additional application, more bandwidth is allocated using a similar process as the original application. The bandwidth requirement may be a result of actual or anticipated heavy usage by the BIntU transceiver 110. The bandwidth allocation is controlled and set up by the application of the BIntU transceiver 110 (including the installed board and associated software included in the BIntU transceiver 110). In one embodiment, the BIntU transceiver 110 can physically allocate as many as, in one embodiment, approximately 150 megabits per second. Use of MPEG audio/video compression technology could increase the effective bandwidth further, but the actual allotted capability of the chipset remains constant. The values for the allocation of the bandwidth are calculated based on the particular application requirements.

In the case of certain embodiments of the BIntU transceiver 110, several aspects relate to the bandwidth allocation process. These aspects include the application options menu (that in one embodiment is fashioned as one type of graphical user interface) that provides the user to a host of application services that are provided. The dynamic and interactive bandwidth allocation approach utilizes a database of application types associated with an accompanying bandwidth reference for QOS delivery. Once a user selects an application, the interface unit provides the necessary adaptation for a required bandwidth. For example, assume that an application requires 10 Mbps of bandwidth allocation to meet QOS guidelines. The interface unit adjusts the transfer rate to provide such allocation. The quality of the transmitted signal for MPEG 2 that was originally designed, for example, for set-top boxes varies according to the application specifications. Consequently, the allotted bandwidth for MPEG will vary. MPEG 2, for example, requires a bandwidth allocation of approximately 4 Mbps MPEG 4 can also be used as other MPEG or other data compression algorithms. Higher-end services, such as high definition television (HDTV) have bandwidth requirements of as high as 80 Mbps.

The components described in the different embodiments of BIntU transceiver 110 provide multiple signal processing stages over various layers and the ability to fine-tune the quality requirement down to the various signal levels. The BIntU transceiver 110 provides a combination of DSP 304 functionality with an on-board codec 302 that outputs signals to a network access ports 310. The BIntU transceiver provides for extremely rapid data transfer having a QOS guarantee. The benefit of using UDPVA is that the signal quality is enhanced since the value-added information indicates when the BIntU transceiver 110 is or is not receiving the signal. The design of the BIntU transceiver 110 allows manipulation of processing signals to deliver convergence to the desktop. The UDPVA packets are otherwise transmitted through the broadband network system 100 as if it were a normal UDP packets (without value-added information). As such, the broadband network system 100 does not have to expend much effort in transmitting the UDPVA packets beyond simply delivering the packets.

The value-added information is included in the header information 509 of the UDPVA packet. The TCP/IP stack 374 functions as if they were transmitting normal UDP packets since the value-added information is added to the header information 509 of the UDPVA packet in a form that is consistent with the standard UDP packet format. UDP, being a connectionless protocol, has some degree of inherent unreliability. However, UDP is the best available protocol to use for the transfer of information data such as video. The manipulation of the header information 509 in UDP packets to provide the UDPVA protocol provides additional levels of feedback on the reliability of the delivery of data. UDPVA includes means to provide return packets back to the source is an example of such manipulation of standard UDP packets to provide value-added information.

During normal operation, the broadband network system 100 assumes that TCP is being used to run the application. Once the BIntU transceiver 110 determines that UDPVA is being used for convergence, a function call is provided to the data control center 104 as indicated at 714 in FIG. 7A. In response, the application layer of the data control center knows to insert the IP address to transmit the UDPVA packets including the value-added information to the desired BIntU transceiver 110. That process is captured within the data control center 104. Data transmitted from the data control center 104 to the BIntU transceiver 110 passes through the codec 302 in the BIntU transceiver 110 where the data is encoded. The audio/video packets are encoded and packetized at the data control center 104. This process requires fast processing so the audio and/or video information does not become stale during transfer. In this manner, the connectionless UDP protocol is modified to the connection oriented UDPVA protocol. If the BIntU transceiver 110 needs additional compression at (e.g., for text transmission purposes), a parallel text stream is run to provide the additional compression at the required level. This compression is provided using suitable processing. The UDPVA packets are transferred across the network at the IP layer.

The end users at the BIntU transceiver 110 do not know whether UDPVA packets or simply UDP packet is being transmitted, except if the network stops transmitting. Under these circumstances using the UDPVA protocol, the data control center 104 will indicate the network transmission problem (and may fix the problem using network management algorithms, or notify the network operator). With UDP, there will be no indication through the network that the packet transmission has failed.

Figure 7A:
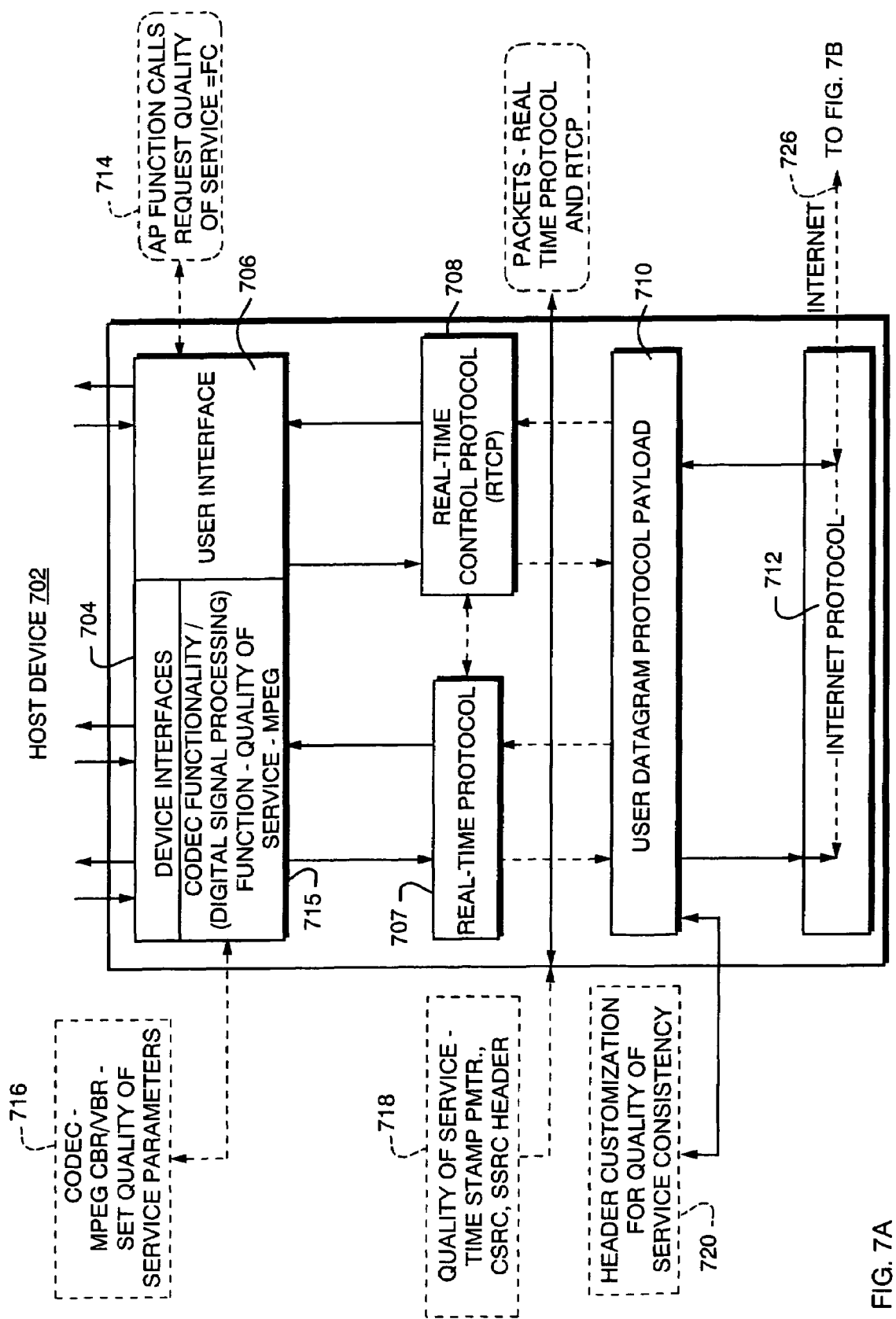
FIGS. 7A and 7B, shows one embodiment of a data flow as would occur through the broadband network system of FIG. 1 between a plurality of end user BIntU transceivers.
Figure 7B:
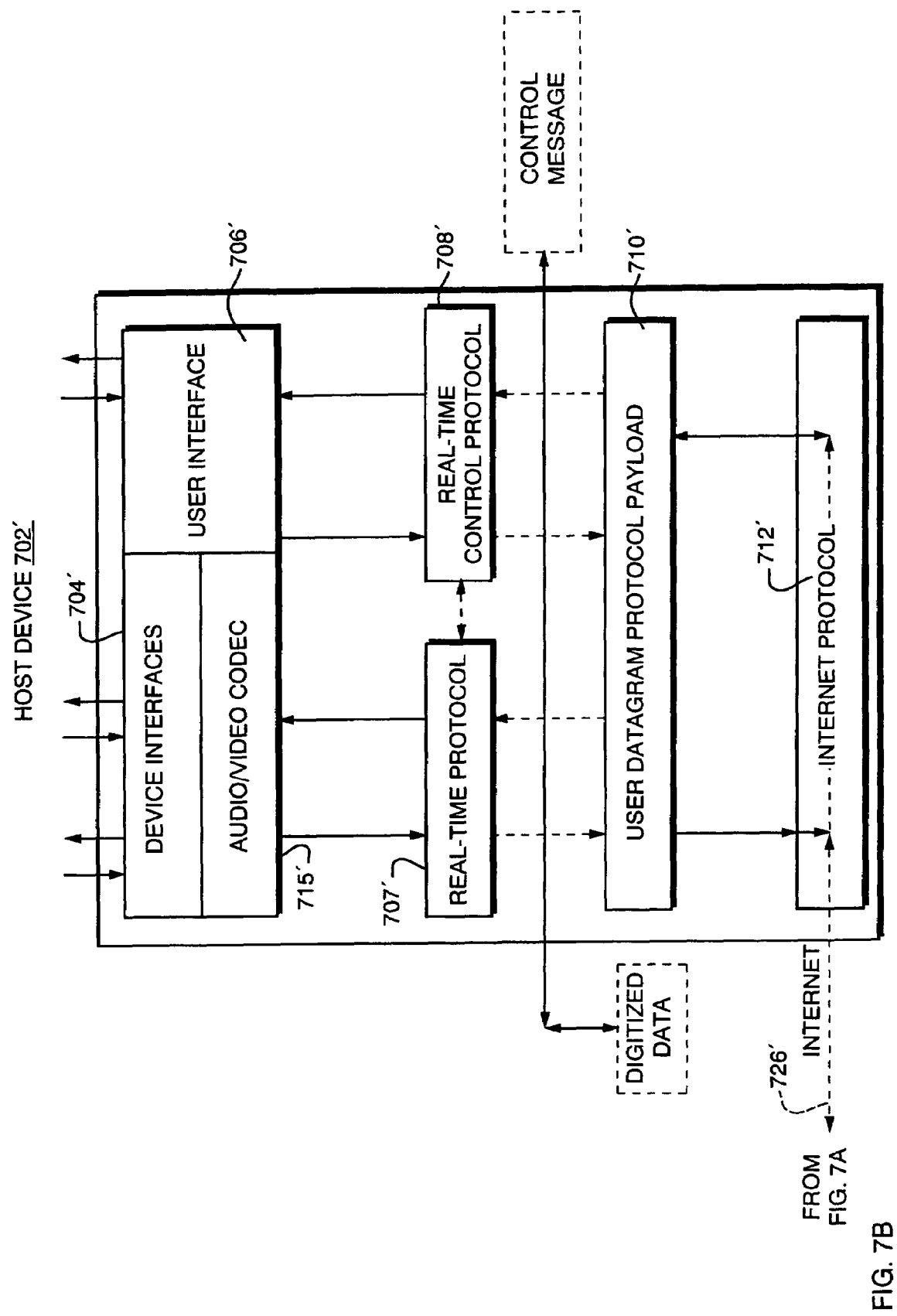

FIG. 7 (including FIGS. 7A and 7B), shows one embodiment of a dataflow diagram as applied to the broadband network system 100 shown in FIGS. 1 and 2, and more bandwidth can be dynamically allocated between a broadband interface device and BIntU transceiver 110. Both the BIntU transceiver 110 and the data control center 104 may be considered as different embodiments of host devices 702. As such, the interaction occurs between host devices and the remainder of the access networks 108 and the core network 106 is similar. As such, though one host device is shown in FIG. 7A and another host device is shown in FIG. 7B, the host device 702 in FIG. 7A is most similar to the distribution control center 104 in that it is configured as transmitting large volumes of video, audio and/or other data to remote BIntU transceivers 110. The host device 702 shown in FIG. 7B is similar to one embodiment of BIntU transceiver 110. Each host device 702 includes device interfaces 704, a user interface 706, a real-time protocol 707, a control protocol 708, a user datagram protocol ((UDP) payload) protocol 710, and an IP protocol 712. A function call 714 is shown as interfacing with the user interface 706. The function call 714 arise from, for example, the computer processor 306 generating a function call to the codec 302 in the network as shown in FIG. 3, as input through the TCP/IP stack 374 of the DSP 304 to the codec 302. A function call 314 is an example for a request of a QOS for a particular UDPVA datastream in which the datastream can carry video and/or audio signals.

The function call 714 cleared within the user interface 706 to select those services that are requested. For example, in one embodiment of dataflow, a compressed video/audio signal will be received at the device interfaces 704. The device interfaces 704 represent the operating system 240, the user system 241, the terminal output 242, the application programming interface 244, and the media plug-ins 246, as shown in FIG. 2. The audio/video signal from the device interfaces 706 will continue through the codec functionality, which cores in the processor portion 248 shown in FIG. 2A. The codec functionality 715 includes digital signal processing, as performed by DSP 304 in FIG. 3, MPEG (MPEG 2 or MPEG 4) compression, and a set of QOS parameters.

Additional functionality is indicated by block 716 in FIG. 7 (including FIGS. 7A and 7B). An output of the codec functionality 715 continues to the real-time control protocol 708. The request for a QOS that was input by the function call from block 714 into the user interface 706 also continues to the real-time control protocol 708. The signal and real-time protocol 707 as well as the request for the QOS in the real-time control protocol 708 are applied to the UDPVA payload 710 in the form of packets. The user datagram protocol 710 undergoes header information customization for QOS consistency, then is applied as datastream into the physical layer at the IP portion 712. Addition of the customization for QOS consistency is input by 720 to the UDP payload 710 in what is referred herein as UDPVA.

UDPVA packets are in a form that can be transmitted as a video/audio/data bit stream, and can be temporarily stored in the TCP/IP stacks 374 to be transmitted as information packets, as shown in FIG. 3. UDPVA packets are transmitted from the TCP/IP stack 374 directly via the network access ports 310 to the access networks 108 and/or the core network 106. UDPVA packets can be transmitted across the Internet, intranet, extranet, or other network in this form, through the various access networks 108 and the core network 106, to be received by another host device 702, such as the BIntU transceiver 110. The host device 702 in FIG. 7A may be the BIntU transceiver 110. The received UDPVA packets are transmitted across the Internet 726 at the IP layer 712 and then uploaded to UDPVA payload 710 as shown in FIG. 7B. The dataflow of the UDPVA payload 712 then continues toward real-time protocol 707' as well as real-time control protocol 708'. An output source that indicates the output destination could be used by the network to route the packets. Instead of the packets being delayed within the computer processor 306 by processing that occurs within computer structures, the packets are inserted directly into the TCP/IP stack 374. The packets can then be quickly transmitted as a stream from the TCP/IP stack 374.

The control messages of the UDPVA payload 710' travel to the real-time control protocol 708' and eventually to the user interface 706'. By comparison, the payload including UDPVA packets continue upward to the real-time protocol 707' into the audio/video codec 715', and eventually into the device interfaces 704'. The host device 702' then uses the audio/video signal received at the device interface 704', and, for example, displays the received signal over a suitable display 233.

In certain embodiments, a router is located in the broadband network system 100 (in either the access networks 108 or the core network 106) to control the bandwidth that can be transmitted from the data control center 104 to the BIntU transceiver 110. The router provides security, encryption, and other operations relating to data transfer. The data control center 104 to operates like a host controller because it is important to use the router to provide communication in the broadband network system 100. The BIntU transceiver 110 interfaces with the data control center 104 to accept this connection.

It is important to indicate how a routing scheme and/or tree structure is established for routing purposes. In one embodiment, parallel trees can be provided for hops. For example, if the packet is located in a wide area network and the end user enters another region of the network such as a remote local area network (LAN), some of the packet information is backed out. A routing tree will be established from the data control center ID4 back to the BIntU transceiver 110. The routing tree has to be established using short hops. The use of short hops necessitates the use of considerable routing to establish the communications between the data control center 104 and the BIntU transceiver 110.

The BIntU transceiver 110 in certain embodiments may be considered as being located at a LAN. At the network or IP layer, the packets are routed using a routing table indicating the address with which the BIntU transceiver 110 interfaces. The routing table is accessed, the corresponding destination address is appended to the packet header information, and the packet is then transmitted over the network using the destination address. For example, assume that the network address of the BIntU transceiver 110 that is returned from the routing table is the URL (i.e., in the form of a number such as 192.38.38.100). The role of the routers is to determine the routing path (such as using a shortest path algorithm) of the packets passing through the devices based on the addresses of the packets to deliver the packets to the remote network devices.

Using the destination address derived or stored in the routing table as derived by the routing algorithm, the UDPVA header information is appended to the UDP packet. The BIntU transceiver 110 then sends the UDPVA packets out via the network to the distribution control center 104. Initially, a copy of the information included in the packet is transmitted over the network to establish a record for the routing table. This copy is not used for data transfer purposes; however, a connection to the destination is established based on the source request of the initial copy.

Upon the establishment of a connection, multicasting can be used. When multicasting is used, multiple representations of the request for connection are transmitted because multiple packets go in multiple connections, so each copy is processed and the number of links traveled by each packet determines the shortest path to the first router.

The router checks the routing table to follow the algorithm for the short dispatches destination, and determine where the next route happens and these will hops and it defines what the shortest hop to its destination. If there are multiple routers connected to the same destination, the router intelligently determines what is the shortest path between the street the same copy of that package and initially saves all the routes. The router then discards those paths that are not the shortest using a pruning technique. During pruning, the records of routes that are not the shortest are not maintained in the routing table. In the router, the route that is connected to the shortest route is stored and maintained. This represents a rating algorithm with intelligence. With multicasting, the router prunes a route from the routing table if it does not see a fit and it establishes a route in the routing table if it does fit.

In one embodiment, a standard router that knows how to transfer UDPVA packets can be used to transfer UDPVA packets. It is important to know the specific type of routing protocol that is in use, and to apply UDPVA packets that can be transferred using the standard routing algorithm. Alternatively, the routers can be modified to handle UDPVA packets. If the routing is used to share data, the broadband network system 100 can be configured to use standard open protocol shortest path first (OSPF). If the broadband network system 100 is using multicasting or video-type routing, a protocol such as multicast open protocol shortest path first (MOSPF) or a similar protocol can be used. In one embodiment, a combination of routing from the BIntU transceiver 110's end and then at the data control center end provides the power to route the packet (using dynamic allocation) with sufficient bandwidth to provide such applications as multimedia and the desired software.

In different embodiments, the BIntU transceiver 110 is located in an end user computer or set-top box. Software that permits the end user computer or set-top box to interface with the BIntU transceiver 110 may be loaded using typical installation and loading techniques. Many of these services can be arranged as upgrades. The billing associated with each BIntU transceiver 110 contains records that indicate the upgrades for each BIntU transceiver 110. The software of the end user computer, when the end user computer boots up, identifies the BIntU transceiver 110 and provides suitable service to the BIntU transceiver 110. The software thus provides a degree of manageability for the service provider.

As such, the service provider should be aware of how the displayed data would appear (e.g., the font and color of text, etc.) to the end user. One service provider can "rent" the use of BIntU transceivers 110 (including the circuit board and associated software) to another service provider. An effective business model of the broadband network system 100 allows for effectively renting access to the network. Additionally, video, audio, or other data owned by a client can be stored at a database or server located at the data control center 104, and the data can be accessed by customers, employees, or members of the client.

The broadband network system 100 can be applied to the entertainment industry in such areas as sporting events. For example, BIntU transceivers 110 can be located in luxury boxes that provide the ability to view concurrent games at different centers while at the same time viewing an event live. A BIntU transceiver 110 might be physically located at a sporting venue in one city and be configured to display another game being played in another city or country.

The treatment of the UDPVA data stream is important for understanding certain embodiments of the broadband network system 100. The signal carrying audio/video information can be managed as it emanates from the data distribution center 104 to the BIntU transceiver 110. Software is designed to be included with the hardware of the BIntU transceiver 110. In one aspect of the present invention, a method for registering the end users of the BIntU transceiver 110 (including the BIntU transceiver board and associated software). As a result of such a method of registration, the BIntU transceiver 110 is connected, and they are will have the ability to connect through a private network to another user. This can be performed over a public network as well as over a private network. A QOS may be used to establish such a connection.

The broadband network system 100 can provide wide area entertainment because there is a potentially huge population of end users. Normally, in a multicasting type of environment, there are multiple signal copies being used, and there are certain protocols being used to establish copies of certain transmissions. The copies of signals are established based on IP model and using a backbone that is based on the network. The embodiments of the present invention allow for pulling down packetized information from satellites, and distributing the packets over a wide area utilizing multimedia systems. This aspect is especially directed to managing satellite transmission, actively controlling the buying of satellite time, and allowing the satellite distribution channel, perhaps 512 Bytes per second to be allocated to each end user. Higher layers and higher rates of mass communications can thus be allocated over a wide area. As such, the broadband network system 100 provides for dynamic allocation of transport rates over a satellite. The downstream link has the bandwidth to support a range of transport rates.

Figure 11A:
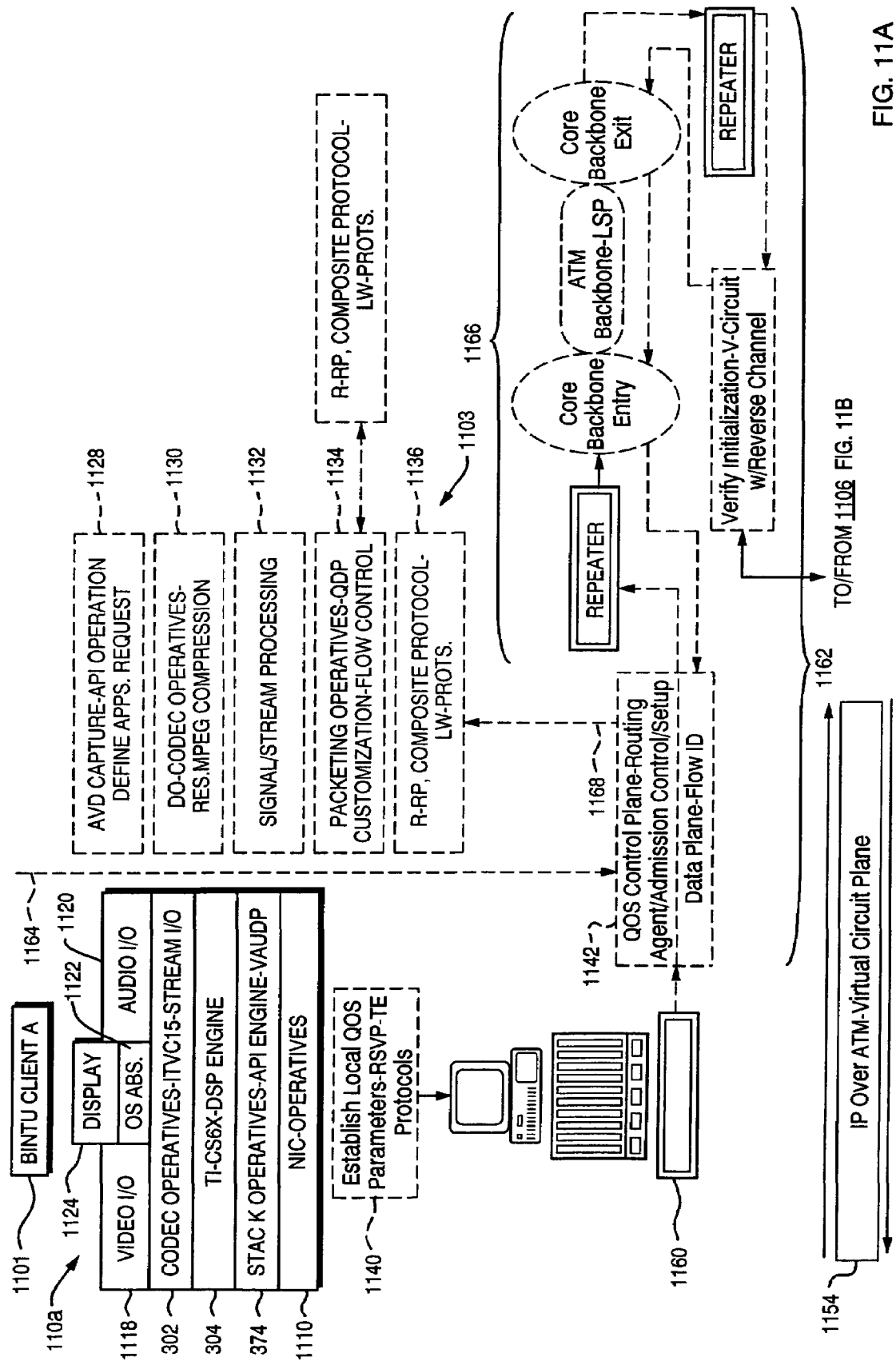
FIG. 11 shows one embodiment of a diagram illustrating the physical operatives and the associated functionality of a connection between one or more BIntU transceivers and the data distribution center.
Figure 11B:
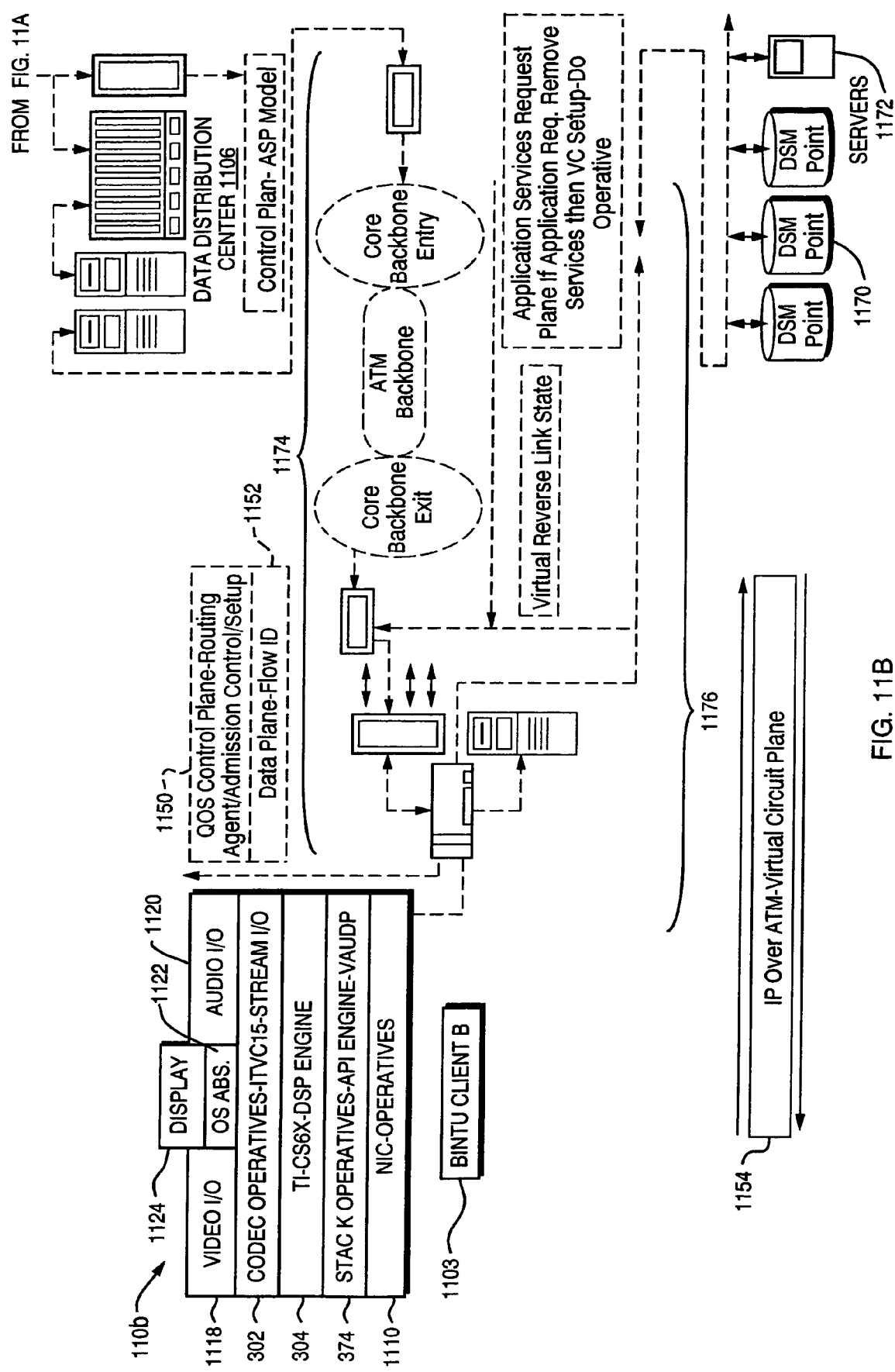

The whole physical operative platform of the broadband network system 100 as shown in FIG. 11 includes two BIntU transceivers 110*a* and 110*b*. Each BIntU transceiver 110*a*, 110*b* is configured similarly to the embodiments of BIntU transceiver 110 described, in e.g., FIGS. 1, 2, and 3. By way of further description r of the flow of data through the BIntU transceiver 110*a*, 110*b*, each BIntU transceiver 110*a*, 110*b* is provided with a control system description 1101 and a flow description 1103. The flow description 1103 for each BIntU transceiver 110*a*, 110*b* is located to the right of the corresponding block in the control system description 1101 that performs that function.

As shown in FIG. 11, the functionality of blocks 1118, 1124, 1122, and/or 1120 is performed by functional block 112. Similarly, the functionality of block 302 is indicated by functional block 1130; the functionality of block 304 is indicated by functional block 1132; the functionality of block 374 is indicated by functional block 1134; and the functionality of block 1110 is indicated by functional block 1136. During a session created between two BIntU transceivers 110 (where a first BIntU transceiver 110 initiated a session with a second BIntU transceiver while no other BIntU transceivers were communicating with the first BIntU transceiver), both BIntU transceivers are configured as indicated by BIntU transceiver 110*a*. If, during a session between two BIntU transceivers 110*a*, one of the BIntU transceivers 110*a* decided to initiate a three-way conversation with a third BIntU transceiver, then the third BIntU transceiver would include the functionality as indicated by BIntU transceiver 110*b*. FIG. 11 describes the functionality that is embedded within BIntU transceiver 110*a* and BIntU transceiver 110*b*.

Consider what occurs when BIntU transceiver 110*a* initiates a normal session with another BIntU transceiver 110*a* or the data distribution center 104, using such an application as teleconferencing, file transfer, or any other communication application. Initially the session is commenced by a virtual channel being established between the data distribution control center(s) and each BIntU transceiver connected thereto using ICMP technology. After the virtual channel is set-up, data can be transmitted via the virtual channel. Assume that the session involves a teleconferencing application in which audio, video, and/or other data is transmitted between end users at BIntU transceivers 110*a*. The video I/O 1118, the audio I/O 1120, and the abstract operating system 1122 in BIntU transceiver 110*a* capture their respective data. Assume, for example, that a video camera with audio associated with the teleconferencing application is connected to video I/O 1118 and audio I/O 1120.

For teleconferencing applications, a display 1124 is provided. The end user at a BIntU transceiver 110*a* can thus see the end user at BIntU transceiver 110*a* or 110*b*, and vice versa.

Functional block 1128 involves the capture of data, the request for capture of data, or other API operatives. Operatives are the requests that are made by the respective application programming interfaces. These APIs generate an application in functional block 1128, and the BIntU transceiver 1102 attempts to make a connection to perform such an application.

The application captured at blocks 1118, 1122, and 1120 is defined through the specifications on the lower-level programming language, so that the captured data flows downward, as shown in FIG. 11, toward the codec 302 that encodes the captured packets as indicated by functional block 1130. The engine of the codec 302 can use any desired type of compression. In one embodiment, the codec 302 is represented by the ITVC15 code 302. For example, video and/or audio compression such as MPEG (e.g., MPEG 2, MPEG 4, or any other flavor) is performed in the codec 302.

As the codec operatives are complete, the engine of the DSP 304 performs the processing of such codec operatives, which is shown functionally at 1132. One embodiment of the DSP 304 may include the TI-CS6X. The signal and stream processing take place in the DSP 304.

The streams that have been encoded are now ready to be transmitted over the medium in a manner that will ensure suitable bandwidth to control the QOS for the transmission of the packets. The ordering and consistency of the packets are controlled by the stack 374. An important part of the stack 374, where the functionality of the UDPVA protocol is provided, is being able to provide the composite UDPVA packets and protocol that works on top of the standard UDP packets and protocol. The value-added is provided in the stacks 374. The stack 374 also acts to control that interface with the application to ensure that data does not overwhelm the stacks 374. The stack 374 is necessary because the stack 374 configures the packets so that they can be transported rapidly over the media.

Consider the embodiment of stack 374 outline shown in FIG. 12. The representation of the application level, the session level, and the presentation level collectively, the ASP levels is shown at 1210. When considering the ASP levels 1210 utilizing a request to use an application, the application could be physically located anywhere in the broadband network system 100. The application relies on content stored in a memory relying on processors. The stacks provide the benefit to the end users of data transmitting a processor. It is difficult for prior systems stored in a memory to quickly process the type of conversion information to deliver it over a network backbone. This delivery of the conversion information is one of the major benefits of certain embodiments of the broadband network system 100. The BIntU transceiver provide the two core elements that enable the converged distribution. The data distribution center 104 is a hosting and control facility. The data distribution center 104 controls which BIntU transceiver 110 is allowed access to any specific data, and when it is allowed access. The medium to transport the data is controlled by the particular BIntU transceivers 110*a*, 110*b*.

Considering the stack operatives in FIG. 11, the application level is used, the real time protocol 1220 is used, the real time control protocol 1222 does standard network control. As such, time stamping parameters, header information parameters, and flow-control parameters are provided. The composite control level 1224 commences the customization that provides composite protocols that generate additional flow control and packet ordering operatives. Packet ordering operatives enhance the use of UDPVA packets. This is the big part here at the composite control level 1224 and the UDP level 1226.

The direct relationship between the composite control level 1224 and the standard UDP level 1226 results in better flow control of the packets at the composite control level 1224 and better ordering of the packets at the UDP level 1226. This is why it is mentioned here as such. There is a relationship between the header information of the and the UDP datagram level 1228. The UDP level 1226 includes the contents shown as the UDP datagram level 1228. The UDP datagram 1228 includes the checksum field 512 having the encapsulated ordering algorithm 570 as described in the embodiment of FIG. 5 that acts on the transmitting side to timestamp the packets, and on the receiving side to order the packets according to their timestamp.

The UDPVA packets continue to carry the IP datagram with UDP encapsulation 1230. The UDP encapsulation is provided by the data encapsulation portion 1231 included in the IP datagram with UDP encapsulation portion 1229. The UDPVA packets are transmitted as a data link frame 1232 by appending a frame header 1234 to the encapsulated frame data 1236. The UDPVA packets continue to be transmitted via a gateway access 1238 to the access network 108 and/or the core network 106. The UDPVA packets returning to a host via one of the access networks 108 and/or the core network 106. The UDPVA packets that enter the host via the access network 108 travels in the return direction, and performs the inverse operations through portions 1232, 1230, 1226, 1224, 1221, and 1210 to the operations as described herein. Different embodiments of host, as shown in FIG. 12, may be physically located in either the BIntU transceiver of the data distribution center. The FIG. 12 embodiment may be considered as a more detailed description of, or an alternate embodiment, of that shown in FIGS. 7A and 7B.

Referring to FIG. 11, continuing to the data link level, which is the link operatives 1142. At this point, we have put in additional feature here, to ensure that initiation of the session commences with an external BIntU transceiver 110a (similar to the BIntU transceiver 110a shown) or BIntU transceiver 110b. The external BIntU transceiver 110a or 110b is signaled in an effort to create a session. The first request for any remote confirmation of a session to be commenced takes place at the link operatives 1142, which indicates with a flow request to its gateway server 1160 an effort to connect with prescribed flow specifications based on the application(s) in terms of the 1162. After the request has been made, the request goes out and indicates to the external BIntU transceiver 110a or 110b a request for communication based on input/output at the video I/O 1118, the audio I/O 1120, the display 1124, and the abstract operating system 1122. This relates to control by the data distribution center. The data distribution center 104 acknowledges true authentication, and authenticates that the transmitting BIntU transceiver is a true BIntU transceiver used by a particular end user, and other specific information that identifies to the gateway server 1160.

The request generally follows the flow paths 1164 and 1162 through to the data distribution center 104. The acknowledgement or confirmation of such a request returns through a virtual channel shown at 1166 and 1168 to ensure communication between the data distribution center 104 and the BIntU transceiver 110a setting up the session. A similar virtual channel shown at 1166 and 1168 is established to the BIntU transceiver 110a or 110b with whom the session is being created. The path of the acknowledgement or confirmation corresponds to the path over which the data is transmitted. The data distribution center 104 stores packets that have been formatted into e.g., an MPEG format for distribution, which formatting occurs in the BIntU transceivers 110a, 110b. The data distribution center 104 acts as the hosting facility where the connections between the BIntU transceivers 110a and 110b are established. The control, the hosting, the bandwidth and the protocols are transmitted from the data distribution channel; sort of like what we are doing, it is an internal hosting Once the requests and the acknowledgement or confirmation are completed, virtual channel is established that provides particular type and bandwidth of application requested is put in place. Based on the type of application is being used, the size and route of the virtual channel is dynamically allocated. For example, the application could be a unilateral application between one BIntU transceiver 110a and the data distribution center 104. Examples of such unilateral applications include the BIntU transceiver 110a accessing data originating from the database 1170 that can be accessed by the data distribution center 104, or video stored in servers 1172. The data distribution center 104 can act as a distributor of formatted stored content. The stored content is formatted so that the data can be distributed. The data distribution center is provided with the bandwidth to distribute the data.

Alternately, the application could be a bilateral application involving a plurality of BIntU transceivers 110a or 110b communicating with one another. The data distribution center 104 controls and monitors the bilateral applications between the plurality of BIntU transceivers 110a, 110b. Once the data distribution center 104 determines that it is allowable for a requesting end user at a BIntU transceiver 110a or 110b to have access to the data, a virtual circuit is created to each participating BIntU transceiver 110a, 110b. The concept of a virtual circuit is known generally relative to asynchronous transfer mode (ATM) communication systems. It is envisioned that the term "virtual circuit" as described herein relates to any circuit, including ATM and other protocols, in which the allowable bandwidth of the circuit is determined based on the particular application. It is important to ensure that the virtual circuit can provide a QOS link between the data distribution center 104 and each BIntU transceiver 110a, 110b.

In other words, the particular application establishes the link between each BIntU transceiver 110a, 110b and the data distribution center 104. One aspect of an application is content that is being transmitted compared to the stored content. For example, if there is an encyclopedia of data residing in the database 1170, or a video residing in the server 1172, an end user at the BIntU transceiver 110a can request a unilateral session in which only that BIntU transceiver 110a is communicating with the data distribution center 104 and accessing the data. However, if an end user at a BIntU transceiver 110a wants to collaborate with another end user at another BIntU transceiver 110a or 110b, and share information therebetween, a bilateral session can be created between each participating BIntU transceiver 110a, 110b. The virtual circuits with prescribed flow specifications established to each BIntU transceiver 110a, 110b are thus set up based on a particular application.

BIntU transceiver 110a and BIntU transceiver 110b have considerably different functionality (note that boxes 1150 and 1152 do not match boxes 1128, 1130, 1132, 1134, and 1136). BIntU transceiver 110b is more related to the additional routing that must take place in a session being extended compared to BIntU transceiver 110*a*. The BIntU transceiver 110*a* requests the data distribution center 104 to connect to the BIntU transceiver 110*b*. BIntU transceiver 110*a* is the initiator. Once the session is set up, the data distribution center 104 monitors the entire conversation between the participating BIntU transceivers 110*a* and 110*b*. Once the setup of the session is completed, the bandwidth provided at the virtual circuits is monitored. A request for tear down of the session can take place at either party and can be generated by either party.

As described herein, if one end user at a BIntU transceiver initially establishes a session with one or more remote BIntU transceivers, the flow of the communications between each BIntU transceiver will be as illustrated by the BIntU transceiver 110*a*. The BIntU transceiver 110*b* displayed lower in FIG. 11 is relevant only once a session has been created between one or more BIntU transceivers 110*a* and a data distribution center 104. Once a session is established involving one or more BIntU transceivers 110*a*, it is not torn down unless an end user at a participating BIntU transceiver 110*a* terminates the session, indicating that it no longer requires the application associated with the session. Certain embodiments of broadband network system 100, however, can accommodate additional applications and sessions. A hypothetical situation will serve to illustrate the importance of the BIntU transceiver 110. Suppose in the hypothetical that two BIntU transceivers 110*a* that initially set up a session are communicating over the broadband network system 100. Data is thus streaming between the two BIntU transceivers 110*a* across the broadband network system 100. The streaming data can be simultaneously redirected to a BIntU transceiver 110*b*. So, lets theoretically say, a first BIntU transceiver 110*a* has streaming video to a second BIntU transceiver 110*a*. But now, assume that one of the BIntU transceivers 110*a* wants to collaborate based on that subject content with another end user at a BIntU transceiver 110*b*. The BIntU transceiver 110*b* could be included in a second session following the establishment of an initial session with an application of one or more BIntU transceivers 110*a*. The second session uses the same application setup as the initial session. One of the end users at the BIntU transceivers 110*a* may want to show the end user at BIntU transceiver 110*b* some of the content of the shared application, and this content can be transmitted to the BIntU transceiver 110*b*.

To establish a session, the request for connection and authentication transmit value added information that generate the reply. That value added information travels a certain distance across the broadband network system, but does not travel all the way to the output facility. The value added information is received into the network operative facility and the stack operatives 21, and indicates that the UDPVA protocol has accepted all the requirements requested from this level. The packet is then temporally ordered using a time stamp, and the packet processed at the BIntU transceiver through the presentation layer, the application layer 412, and the session layer. The transportation of that value added information takes place at the transport layer 410. The presentation layer, the application layer 412, and the session layer therefore represent the formatting of the packets, the transmission of the packets, and also the session operatives 374.

The transmitted data is authenticated and can be used in this connection. When a conversation or session is in full swing, and this person needs to respond with video and voice between BIntU client A and BIntU client B, the UDPVA packets travel to the data distribution center, the packets then return to the receiving BIntU transceiver. At the receiving BIntU transceiver, the UDPVA packets are reversed processed, decoded, that is extends through 1110, 374, 304, 302, and 1118/1120 in the BIntU transceiver 110*a*. The received video data is displayed over display 1124. Levels of interactivity of stack accepting connection and the user has a second interactive point where the actual application output at display 1124. Initiation, beyond a client, takes place if the client is sending bulletins, for security reasons, from the data distribution center to live clients. Such as, if a network operator wants to send a message that a server relating to certain BIntU transceivers 110 is going to be down for maintenance purposes, then the network operator can generate a packet from the data distribution center 104 to the live clients at the BIntU transceiver.

The data distribution center 104 facilitates the connection to the BIntU transceiver 110*b*. The data distribution center 104 determines the flow characteristics required for the communications to each participating BIntU transceiver 110*a*, 110*b* from the data distribution center 104. For example, the data distribution center 104 knows following initial set-up of the session that each BIntU client 110*a* is connected. A signal is transmitted to the data distribution center 104 indicating that one of the BIntU transceivers 110*a* desires to include BIntU transceiver 110*b* in that session. A virtual circuit is established between the data distribution center 104 and BIntU transceiver 110*b* to tie in BIntU transceiver 110*b*. The commencement of the virtual circuit being set up over the core network and a new delivery system is shown as 1174. All BIntU transceivers 110*a*, 110*b* require similar circuit specifications to allow communications therebetween. That is, the structure of the BIntU transceiver 110*a* is similar to the structure of the BIntU transceiver 110*b*. Once the end user at the BIntU transceiver 110*b* is recognized at the point of contact (through security techniques), a request reply is transmitted across 1176 back to the data distribution center 104.

This call set-up and break-down is all going on in the lower levels or the protocols. Once a session is established, an access server 110*b* of the BIntU transceiver 110*b* establishes a link between that BIntU transceiver 110*b* and any other participating BIntU transceivers 110*a*. Any end user at a called BIntU transceiver 110*a* or 110*b* has to accept the call for in order to be included in the session. Once the BIntU transceiver 110*a* or 110*b* accepts, the acceptance is authenticated back through the data distribution center 104. Once the authentication is completed, the session becomes complete in terms of connecting the end users at the participating BIntU transceivers 110*a*, 110*b*.

Another aspect of the broadband network system involves a security system 168. Certain embodiments of broadband network system 100 having a security system 168 includes a first security portion 170 located at each BIntU transceiver 110 and a second security portion 172 located at the data distribution center 104 as shown in FIG. 2A. The security system 168 relates to providing a secure interface between the BIntU transceiver 110 and the data distribution center 104 for each virtual channel. Security allows the data distribution center 104 to positively identify an end user at the BIntU transceiver as the correct end user. The BIntU unit thus uses the security system 168 to authenticate the identity of an end user. In one embodiment, the security system provides verifiable, undeniable proof of the identity of the end user.

Most prior-art embodiments of network systems use user ID pass code to provide security. It is envisioned that certain embodiments of the broadband network system 100 may use a smart card reader, a bio-metric, or another security device to provide a security system 168. Encryption systems rely on private and public key. The private key in certain embodiments of the security system 168 is located at the first security portion 170 included in the BIntU transceiver. The first security portion 170 represents the private key (software and/or hardware) associated with the bio-metric, retinal scan, or smart card of the end user. The security system allows for replacing the user ID and pass code in the current network, using a biometric, smart card, retinal scan, etc. to log on.

The public key and private key combine to provide an alternative PKI infrastructure. One embodiment of data distribution center may thus be considered as an alternative PKI infrastructure to end users. The broadband network system thus acts to provide alternative distribution for video and data, but also provides an alternate PKI infrastructure for security and authentication for transactions. The security system 168 is involved with allowing a connection to be established between the BIntU transceiver 110 and the data distribution center 104 to provide a quality of service. The security system thus acts as the delivery system.

The data distribution center 104 is the host repository for the public key (which is the hardware/software associated with the bio-metric, smart chip, retinal scan, or other security device). The first security portion 172 at the BIntU unit 110 includes a reader, used in combination with the end users' fingertip, smart card, etc., that provides the private key.

The security system provides authorization that allows the broadband interface unit to interface with the data distribution center. When an end user plugs in their BIntU transceiver, they download the associated software and register themselves as an authorized user of the broadband network system. Security 168 adds the requirement to register the end-user's private key (e.g., a bio-metric, a retinal scan, the smart card, or another private key). Such end user registration allows the end user to become an authorized user in the PKI type in the broadband network system 100. With the broadband network system 100, the end user is authorized to register their bio, smart card, or retinal scan to become an authorized user. So that if an end user at one BIntU transceiver is transmitting secured packets to another BIntU transceiver end user, the bio-metric, smart card, or retinal scan is registered and the data distribution center will not send that information until it authorizes the end user as an authorized user of the network. As such, the end user at the receiving BIntU transceiver will know the identity of the end user at the transmitting BIntU transceiver.

Certain embodiments of the broadband network system 100 can be used as an intelligent agent device that provides intelligent agent functionality. Intelligent agent devices are especially useful where it is desired to be able to accurately monitor, and precisely control, the operation of BIntU transceiver. For example, in order to be able to monitor suspicious-looking boxes at airports, or alternatively to be able to monitor the conditions at certain locations within a nuclear power plant, the BIntU transceivers may be utilized effectively. For example, a single BIntU transceiver may have a plurality of camcorders attached thereto. Each of the camcorders may be directed at a different location, for example, within an airport, within a nuclear power plant, or within, e.g., a bank, store, or office building that is being monitored. Remote monitoring individuals can monitor the locations throughout the location where the BIntU transceiver is located by interfacing with that BIntU transceiver at a remote BIntU transceiver. Though the camcorders may be continuously operating, the monitoring end users can select which of the camcorders to view by selecting one of the plurality of channels, for example. Each channel would correspond to a distinct one of the camcorders at the monitoring BIntU transceiver. Audio data as well as video data can also be captured at a plurality of locations using the intelligent agent device for such applications.

The BIntU transceiver can be used in a variety of applications, such as use in a security area. Today, great significance is placed on surveillance, etc. Capturing video and voice at a first BIntU transceiver is desirable. Lets assume a suspicious box is left in an airport. A BIntU transceiver unit that can be configured to reposition itself can generate signals at a remote sentry BIntU transceiver based upon inputs from the sentry perceptions and input. For example, an end user at the remote sentry BIntU transceiver may indicate to generate a session.

The BIntU transceiver can act by itself. Just suppose there are six camcorders connected to the BIntU transceiver now and an end user at a receiving BIntU transceiver wishes to monitor the BIntU transceiver at an airport or in a remote location, that would necessary come back to the data distribution center and an end user at a remote BIntU transceiver could monitor the data. This application is generated by the BIntU transceiver client; therefore the "surveillance application" is under the control of that BIntU transceiver client. However, notice of the application being operative is recorded by the data distribution center, since metering for billing purposes will be calculated at the data distribution center.

While the principles of the invention have been described above in connection with the specific apparatus and associated method, it is to be clearly understood that this description is made only by way of example and not as a limitation on the scope of the invention.

The invention claimed is:

1. In an Open System Interconnection (OSI) model having at least a transport layer, a method for transferring user datagram protocol (UDP) packets over a broadband network system from a broadband interface unit (BIntU) transceiver to a data distribution center, wherein the data distribution center is coupled over a network to a network access point, the method comprising:

supplying function calls to the BIntU transceiver from a personal computer with a computer processor, wherein the personal computer is separate from the BIntU transceiver, and the BIntU transceiver is positioned between the network access point and the personal computer;

generating the UDP packets in the BIntU transceiver and transmitting the UDP packets over the network solely at the transport layer, the generating and transmitting of the UDP packets including:

encoding, with an encoder, audio or video information, within the BIntU transceiver at the transport layer in order to generate UDP frame information at the transport layer;

temporarily storing the UDP frame information solely at the transport layer as a UDP packet within the BIntU transceiver;

transmitting the UDP packet directly from the BIntU transceiver to the network access point at the transport layer;

transmitting the UDP packet from the network access point to the data distribution center at the transport layer;

transmitting the UDP packet from the data distribution center to a network destination address device at the transport layer;

wherein the UDP information output by the encoder travels from the encoder to the network access point solely at the transport layer and without being processed by the computer processor in the personal computer; and indicating, by the data distribution center, that the data distribution center received information from the BIntU transceiver in response to the UDP packet.

2. The method of claim 1, wherein the UDP packet includes an applet.

3. In an Open System Interconnection (OSI) model having at least an application layer and a transport layer, a broadband network system configured to transfer user datagram protocol (UDP) packets from a broadband interface unit (BIntU) transceiver, the broadband network system comprising:

a network access point;

a data distribution center coupled over a network to the network access point;

a personal computer with a computer processor that supplies function calls to the BIntU transceiver; where the personal computer is separate from the BIntU tranceiver, and the BIntU transceiver is positioned between the network access point and the personal computer;

wherein the BIntU transceiver generates packets for transmission over the network solely at the transport layer, and the BIntU transceiver includes:

an encoder/decoder (codec) configured to alternatively encode or decode audio or video information at the transport layer and alternatively output or receive UDP frame information at the transport layer, and a digital signal processor (DSP) portion coupled to the codec, wherein the DSP portion temporarily stores the UDP frame information solely at the transport layer as a UDP packet within the BIntU transceiver, and wherein when said codec functions to encode audio or video information, the UDP packet is transmitted directly from the codec to the DSP portion, the UDP packet is transmitted from the DSP portion to the network access point at the transport layer; the UDP packet is transmitted from the network access point to the data distribution center at the transport layer; and the UDP packet is transmitted from the data distribution center to a network destination address device at the transport layer; wherein the UDP information output by the codec travels from the codec to the network access point solely at the transport layer and without being processed by the computer processor in the personal computer; and wherein the data distribution center is configured to receive the UDP packet from the BIntU transceiver at the transport layer, and the data distribution center is configured to interface with the BIntU transceiver to indicate whether the data distribution center received information from the BIntU transceiver wherein data transmitted between the BIntU transceiver and the data distribution center is maintained at the transport layer.

4. The broadband network system of claim 3, further comprising a second BIntU transceiver, wherein the data distribution control center forwards the UDP packet to the second BIntU transceiver, and the second BIntU transceiver generates a return packet that is forwarded via the data distribution center to the BIntU transceiver that indicates that the second BIntU transceiver has received the UDP packet.

* * * * *